US00RE49591E

(19) United States
(12) Reissued Patent
Kaushik et al.

(10) Patent Number: US RE49,591 E
(45) Date of Reissued Patent: Jul. 25, 2023

(54) POWER SAVING TECHNIQUES IN COMPUTING DEVICES

(71) Applicant: QUALCOMM Incorporated, San Diego, CA (US)

(72) Inventors: Vinod Harimohan Kaushik, San Diego, CA (US); Uppinder Singh Babbar, San Diego, CA (US); Andrei Danaila, San Diego, CA (US); Neven Klacar, San Diego, CA (US); Muralidhar Coimbatore Krishnamoorthy, San Diego, CA (US); Arunn Coimbatore Krishnamurthy, San Diego, CA (US); Vaibhav Kumar, Encinitas, CA (US); Vanitha Aravamudhan Kumar, San Diego, CA (US); Shailesh Maheshwari, San Diego, CA (US); Alok Mitra, San Diego, CA (US); Roshan Thomas Pius, San Jose, CA (US); Hariharan Sukumar, San Diego, CA (US)

(73) Assignee: QUALCOMM Incorporated, San Diego, CA (US)

(21) Appl. No.: 17/387,544

(22) Filed: Jul. 28, 2021

Related U.S. Patent Documents

Reissue of:
(64) Patent No.: 9,535,490
Issued: Jan. 3, 2017
Appl. No.: 14/568,694
Filed: Dec. 12, 2014

U.S. Applications:
(63) Continuation of application No. 17/240,496, filed on Apr. 26, 2021, which is an application for the reissue of Pat. No. 9,535,490.

(Continued)

(51) Int. Cl.
*H04W 52/02* (2009.01)
*G06F 13/38* (2006.01)

(Continued)

(52) U.S. Cl.
CPC ..... *H04W 52/0251* (2013.01); *G06F 1/3253* (2013.01); *G06F 1/3287* (2013.01);

(Continued)

(58) Field of Classification Search
CPC ..... G06F 1/3287; G06F 1/3253; G06F 13/38; H04W 52/0274; H04W 52/0287;

(Continued)

(56) References Cited

U.S. PATENT DOCUMENTS 5,118,385 A 6/1992 Kumar et al.
5,167,024 A 11/1992 Smith et al.

(Continued)

FOREIGN PATENT DOCUMENTS

CN 101615067 A 12/2009
CN 101802753 A 8/2010

(Continued)

OTHER PUBLICATIONS

IPR Final Written Decision, Intel Corporation v. Qualcomm Incorporated, IPR2018-01261, Paper 30 (PTAB, Jan. 9, 2020).

(Continued)

*Primary Examiner* — Jalatee Worjloh
(74) *Attorney, Agent, or Firm* — Qualcomm Incorporated

(57) ABSTRACT

Aspects disclosed in the detailed description include power saving techniques in computing devices. In particular, as data is received by a modem processor in a computing device, the data is held until the expiration of a modem timer. The data is then passed to an application processor in the computing device over a peripheral component interconnect express (PCIe) interconnectivity bus. On receipt of the data from the modem processor, the application processor sends data held by the application processor to the modem processor over the PCIe interconnectivity bus. The application processor also has an uplink timer. If no data is (Continued)

received from the modem processor before expiration of the uplink timer, the application processor sends any collected data to the modem processor at expiration of the uplink timer. However, if data is received from the modem processor, the uplink timer is reset.

10 Claims, 13 Drawing Sheets

Related U.S. Application Data

(60) Provisional application No. 62/019,073, filed on Jun. 30, 2014, provisional application No. 61/916,498, filed on Dec. 16, 2013.

(51) Int. Cl.
*H04W 4/60* (2018.01)
*G06F 1/3287* (2019.01)
*G06F 1/3234* (2019.01)

(52) U.S. Cl.
CPC ..... *G06F 13/38* (2013.01); *H04W 4/60* (2018.02); *H04W 52/0274* (2013.01); *Y02D 10/00* (2018.01); *Y02D 30/70* (2020.08)

(58) Field of Classification Search
CPC ..... H04W 52/02; H04W 52/51; H04W 4/60; Y02D 30/70; Y02D 10/00
See application file for complete search history.

(56) References Cited

U.S. PATENT DOCUMENTS 5,170,470 A 12/1992 Pindar et al.
5,481,747 A 1/1996 Kametani
5,619,681 A * 4/1997 Benhamida ..... G06F 13/385 703/23
6,021,264 A * 2/2000 Morita ..... G06F 13/4213 710/117
6,085,273 A 7/2000 Ball et al.
6,151,355 A * 11/2000 Vallee ..... G06F 13/385 375/220
6,182,178 B1 1/2001 Kelley et al.
6,272,452 B1 * 8/2001 Wu ..... G06F 13/385 703/24
6,472,770 B1 * 10/2002 Pohjola ..... B60R 16/0315 307/10.1
6,765,901 B1 * 7/2004 Johnson ..... H04L 12/2856 370/352
6,795,877 B2 9/2004 Glenn
6,972,445 B2 12/2005 Chang
6,996,214 B1 * 2/2006 Beck ..... H04M 3/4281 379/215.01
7,058,421 B2 6/2006 Ngai et al.
7,103,888 B1 9/2006 Cayton et al.
7,136,645 B2 11/2006 Hanson et al.
7,137,018 B2 11/2006 Gutman et al.
RE39,427 E * 12/2006 O'Sullivan ..... 455/126
7,194,642 B2 3/2007 Pontarelli
7,206,864 B2 4/2007 Enko et al.
7,310,535 B1 12/2007 MacKenzie et al.
7,338,884 B2 3/2008 Shimoto et al.
7,379,475 B2 5/2008 Minami et al.
7,424,632 B2 9/2008 Powers et al.
7,450,963 B2 11/2008 Krishnan et al.
7,475,167 B2 1/2009 Wunderlich et al.
7,535,907 B2 5/2009 Hussain et al.
7,542,437 B1 6/2009 Redi et al.
7,564,860 B2 7/2009 Wybenga et al.
7,603,574 B1 10/2009 Gyugyi et al.
7,610,061 B2 10/2009 Suh et al.
7,647,517 B2 1/2010 Tseng et al.
7,694,049 B2 4/2010 Goh et al.
7,702,748 B2 4/2010 Ramey
7,751,442 B2 7/2010 Chang et al.
7,765,391 B2 7/2010 Uemura et al.
7,785,478 B2 8/2010 Whitekettle et al.
7,796,589 B2 9/2010 Cohen et al.
7,831,849 B2 11/2010 Kwa et al.
7,852,867 B2 12/2010 Tsang et al.
7,898,994 B2 3/2011 Zhao et al.
7,899,018 B2 3/2011 Balasubramanian et al.
7,923,828 B2 4/2011 Endo et al.
3,032,181 A1 10/2011 Hauck et al.
8,078,768 B2 12/2011 Manor et al.
8,112,646 B2 * 2/2012 Tsai ..... G06F 1/3209 713/340
8,145,920 B2 3/2012 Tsai et al.
8,160,000 B2 * 4/2012 Balasubramanian ..... H04W 52/0222 370/335
8,196,293 B2 6/2012 Ko
8,279,790 B2 10/2012 Wang et al.
8,281,101 B2 10/2012 Bains et al.
8,312,307 B2 11/2012 Hays
8,406,725 B2 3/2013 Plestid et al.
8,462,684 B1 6/2013 Kopikare et al.
8,495,403 B2 7/2013 Wang et al.
8,615,671 B2 12/2013 Robles et al.
8,635,469 B2 1/2014 Wang et al.
8,650,427 B2 2/2014 Knolla et al.
8,661,167 B2 2/2014 Hsin et al.
8,782,456 B2 7/2014 Tan et al.
8,838,949 B2 9/2014 Gupta et al.
8,839,015 B2 9/2014 Hays
8,938,551 B2 1/2015 Leucht-Roth
8,959,265 B2 2/2015 Hayut et al.
8,966,302 B2 2/2015 Sinha
8,972,646 B2 3/2015 Ranganathan et al.
8,996,078 B2 3/2015 Castor et al.
9,218,290 B2 12/2015 Sonnier et al.
9,226,234 B2 12/2015 Kalla
9,246,846 B2 1/2016 Fan et al.
9,264,368 B2 2/2016 Swarbrick et al.
9,311,145 B2 4/2016 Maciocco et al.
9,329,671 B2 * 5/2016 Heinrich ..... G06F 1/329
9,338,279 B2 5/2016 Kuehnel et al.
9,348,523 B2 5/2016 Busaba et al.
9,431,077 B2 8/2016 Shacham et al.
9,510,242 B2 11/2016 Delorme et al.
9,513,662 B2 12/2016 Chin et al.
9,535,490 B2 1/2017 Kaushik et al.
9,578,676 B2 2/2017 Zheng et al.
2003/0114186 A1 * 6/2003 Goetz ..... H04M 1/725 455/552.1
2004/0004964 A1 1/2004 Lakshmanamurthy et al.
2004/0225760 A1 11/2004 Lee
2004/0264396 A1 12/2004 Ginzburg et al.
2005/0060365 A1 3/2005 Robinson et al.
2005/0165985 A1 7/2005 Vangal et al.
2005/0203917 A1 9/2005 Freeberg et al.
2006/0154642 A1 7/2006 Scannell, Jr.
2006/0161707 A1 7/2006 Davies et al.
2006/0195706 A1 8/2006 Burchard et al.
2006/0288209 A1 12/2006 Vogler
2007/0136264 A1 6/2007 Tran
2007/0140199 A1 6/2007 Zhao et al.
2007/0259673 A1 11/2007 Willars et al.
2008/0034106 A1 2/2008 Bakshi et al.
2008/0046665 A1 2/2008 Kim
2008/0101446 A1 5/2008 Gautier et al.
2009/0029735 A1 1/2009 Nakagwa et al.
2009/0039034 A1 2/2009 Whitekettle et al.
2009/0132582 A1 5/2009 Kim et al.
2009/0164821 A1 6/2009 Drescher
2009/0185487 A1 7/2009 Adar et al.
2009/0203409 A1 8/2009 Castor et al.
2009/0249041 A1 10/2009 Damaraju et al.
2009/0323686 A1 12/2009 Dyck et al.
2011/0010480 A1 1/2011 Auernhammer
2011/0013353 A1 1/2011 Kwon et al.
2011/0145445 A1 6/2011 Malamant et al.

(56) References Cited

U.S. PATENT DOCUMENTS

| | | | | |
|---|---|---|---|---|
| 2011/0154475 | A1* | 6/2011 | Wu | H04L 63/101 726/13 |
| 2012/0077464 | A1* | 3/2012 | Nair | H04M 15/8033 455/411 |
| 2012/0120860 | A1 | 5/2012 | Chui et al. | |
| 2013/0100787 | A1 | 4/2013 | Fujiune et al. | |
| 2013/0198538 | A1 | 8/2013 | Diab et al. | |
| 2013/0204962 | A1 | 8/2013 | Estevez et al. | |
| 2013/0238915 | A1 | 9/2013 | Kashikar | |
| 2014/0068354 | A1 | 3/2014 | Park et al. | |
| 2014/0157009 | A1* | 6/2014 | Kherani | G06F 1/3278 713/300 |
| 2014/0207991 | A1 | 7/2014 | Kaushik et al. | |
| 2014/0344429 | A1 | 11/2014 | Baumann et al. | |
| 2015/0086064 | A1 | 3/2015 | Froemel | |
| 2015/0169037 | A1 | 6/2015 | Kaushik et al. | |
| 2015/0212564 | A1 | 7/2015 | Min et al. | |
| 2016/0164990 | A1 | 6/2016 | Zhang et al. | |
| 2016/0226530 | A1 | 8/2016 | Hayem et al. | |
| 2016/0309365 | A1 | 10/2016 | Runeson | |
| 2016/0314055 | A1 | 10/2016 | Bagchi et al. | |

FOREIGN PATENT DOCUMENTS

| | | | |
|---|---|---|---|
| CN | 102124454 | A | 7/2011 |
| CN | 102204363 | A | 9/2011 |
| CN | 103077141 | A | 5/2013 |
| CN | 103168498 | A | 6/2013 |
| CN | 103270466 | A | 8/2013 |
| CN | 103314620 | A | 9/2013 |
| EP | 0534529 | A1 | 3/1993 |
| EP | 0475282 | B1 | 12/1998 |
| EP | 1653331 | A2 | 5/2006 |
| EP | 2640136 | A2 | 9/2013 |
| EP | 2876945 | A1 | 5/2015 |
| JP | 2003087338 | A | 3/2003 |
| KR | 20030082724 | A | 10/2003 |
| KR | 20050023262 | A | 3/2005 |
| KR | 20090006183 | A | 1/2009 |
| KR | 20110106368 | A | 9/2011 |
| TW | 201011553 | A | 3/2010 |
| TW | 201015289 | A | 4/2010 |
| TW | 201329695 | A | 7/2013 |
| WO | 0052585 | A2 | 9/2000 |
| WO | 2004040796 | A1 | 5/2004 |
| WO | 2005074611 | A2 | 8/2005 |
| WO | 2007074343 | A2 | 7/2007 |
| WO | 2007146549 | A2 | 12/2007 |
| WO | 2008054974 | A2 | 5/2008 |
| WO | 2009039034 | A1 | 3/2009 |
| WO | 2009122380 | A1 | 10/2009 |
| WO | 2010022368 | | 2/2010 |
| WO | 2010030768 | A2 | 3/2010 |
| WO | 2010125429 | A1 | 11/2010 |
| WO | 2012083486 | A1 | 6/2012 |
| WO | 2012128793 | A1 | 9/2012 |
| WO | 2014088862 | A1 | 6/2014 |
| WO | 2014165346 | A1 | 10/2014 |

OTHER PUBLICATIONS

Ajanovic J., "PCI Express (TM) Architecture Advanced Protocols & Features PCI Express (TM) Architecture Advanced Protocols & Features," Dec. 31, 2003 (Dec. 31, 2003), XP055172048, PCI-SIG Developers Conference Retrieved from the Internet URL: https://www.pcisig.com/developers/main/training_materials/get_document?doc_id=f275ada7d622d20947d69cbb34b6e0a0622249c3 [retrieved on Feb. 25, 2015] slides 23-28, 49 pages.

Author Unknown, "IEEE Standard Microcontroller System Serial Control Bus," IEEE Std 1118-1990, 1991, Institute of Electrical and Electronics Engineers, Inc., 252 pages.

Betker M.R., et al., "The History of the Microprocessor," Bell Labs Technical Journal, vol. 2, Issue 4, Autumn 1997, pp. 29-56.

Author Unknown, "IEEE Standard for Information technology—Telecommunications and information exchange between systemsLocal and metropolitan area networks—Specific requirements, Part 11: Wireless LAN Medium Access Control (MAC) and Physical Layer (PHY) Specifications," IEEE Std 802.11™-2012, Mar. 29, 2012, IEEE Computer Society, 2793 pages.

Culler, D. et al., "Parallel Computer Architecture: A Hardware/Software Approach," Morgan Kaufmann, 1999, 877 pages.

Downing, D. et al., "Dictionary of Computer and Internet Terms," Eleventh Edition, 2013, Barron's Educational Series, pp. 396-397.

Duan, Z., et al., "Push vs Pull: Implications of Protocol Design on Controlling Unwanted Traffic," Proceedings of the Steps to Reducing Unwanted Traffic on the Internet Workshop (SRUTI'05), Jul. 2005, Cambridge, MA, 4 pages.

Extended European Search Report for European Patent Application No. 18160829.0, dated Jun. 27, 2018, 11 pages.

Extended European Search Report for European Patent Application No. 19154607.6, dated Jun. 26, 2019, 10 pages.

Extended European Search Report for European Patent Application No. 19162655.5, dated May 31, 2019, 8 pages.

Gerber, A., et al., "P2P, the Gorilla in the Cable," Proceedings of National Cable & Telecommunications Association (NCTA), Jun. 2003, Chicago, IL, 13 pages.

Gupta M., et al., "Using Low-Power Modes for Energy Conservation in Ethernet LANs," 26th IEEE International Conference on Computer Communications, May 6-12, 2007, Anchorage, AK, USA, 5 pages.

Halperin, D., et al., "Demystifying 802.11n Power Consumption," HotPower'10: Proceedings of the 2010 International Conference on Power Aware Computing and Systems, Oct. 2010, 5 pages.

Chen, Y. et al., "Power Management for VoIP over IEEE 802.11 WLAN" Wireless Communications and Networking Conference (WCNC 2004), Mar. 2004, IEEE Communications Society, pp. 1648-1653.

Houghton Mifflin Company, "The American Heritage College Dictionary," Third Edition, 2000, p. 1444.

Kong, K., "Introduction to the PES32NT24G2 PCI Express Switch Features," Application Note AN-713, IDT, Sep. 10, 2009, Renesas Electronics Corporation, 13 pages.

Kwa, S. et al., "PCI Express Architecture Power Management," Rev 1.1, White Paper, Nov. 8, 2002, Intel Corporation, 15 pages.

Intel, "The BITBUS Interconnect Serial Bus Control Specification," Intel Corporation, 1988, 51 pages.

International Preliminary Report on Patentability for PCT/US2014/070368, dated Apr. 1, 2016, 33 pages.

International Search Report and Written Opinion for PCT/US2014/070368, dated Mar. 5, 2015, 14 pages.

Kamath, S., et al., "Application Note AN092—Measuring Bluetooth Low Energy Power Consumption," Revision SWRA347A, Apr. 13, 2012, Texas Instruments, 24 pages.

Kaplan, S.M., "Wiley Electrical and Electronics Engineering Dictionary," 2004, John Wiley & Sons, Inc., pp. 611-615.

Kolbehdari, M. et al., "The Emergence of PCI Express in the Next Generation of Mobile Platforms," Intel Technology Journal, vol. 9, Issue 1, 2005, pp. 21-34.

Kravets, R. et al., "Application-driven power management for mobile communication," Wireless Networks, vol. 6, 2000, J.C. Baltzer AG, Science Publishers, pp. 263-277.

Merriam-Webster, "Merriam-Webster's Collegiate Dictionary," Eleventh Edition, 2000, Merriam-Webster, Inc., p. 1337.

Motorola, "HC11—MC68HC11PH8/MC68HC7 11PH8 Technical Data," Motorola Ltd., Jun. 1997, 264 pages.

Pakin, S., et at., "Fast Messages: Efficient, Portable Communication for Workstation Clusters and MPPs," IEEE Concurrency, vol. 5, Issue 2, Apr.-Jun. 1997, pp. 60-73.

Panda P.R., et al., "On-Chip vs Off-Chip Memory: The Data Partitioning Problem in Embedded Processor-Based Systems,"ACM Transactions on Design Automation of Electronic Systems, vol. 5, No. 3, Jul. 2000, pp. 682-704.

Author Unknown, "PCI Bus Power Management Interface Specification," Revision 1.2, Mar. 3, 2004, PCI-SIG, 74 pages.

Author Unknown, "PCI Express 2.0 Base Specification," Revision 0.9, Sep. 11, 2006, PCI-SIG, 632 pages.

(56) References Cited

OTHER PUBLICATIONS

Author Unknown, "Core System Package [Low Energy Controller volume,]" Specification vol. 6: Specification of the Bluetooth System, Version 4.0, Jun. 30, 2010, Retrieved from the Internet: URL:www.bluetooth.com [retrieved on Jan. 12, 2012], 136 pages.
Saade J., et al., "A System-Level Overview and Comparison of Three High-Speed Serial Links: USB 3.0, PCI Express 2.0 and LLI 1.0," IEEE 16th International Symposium on Design and Diagnostics of Electronic Circuits & Systems (DDECS), Apr. 2013, IEEE, pp. 147-152.
Saar, H. et al., "The MIPI M-PHY Reduces Power In Mobile Chip-To-ChipInterfaces," Electronic Design, May 6, 2013, http://electronicdesign.com/print/power/mipi-m-phy-reduces-power-mobile-chip-chip-interfaces, 7 pages.
Second Written Opinion from International Application No. PCT/US2014/070368, dated Nov. 9, 2015, 5 pp.
Soanes, C., et al., "Concise Oxford English Dictionary," Eleventh Edition, 2004, Oxford University Press, p. 1541.
Stabley, Z., et al., "Intel I350 Ethernet Controller and DMA Coalescing," White Paper, Intel® Power Management & I350 Ethernet Controller, 2011, Intel Corporation, 6 pages.
Sullivan, M.J. et al., "Intel® Xeon® Processor C5500/C3500 Series Non-Transparent Bridge," Intel® Xeon® Processor C5500/C3500 Series Non-Transparent Bridge, White Paper, Jan. 2010, Document No. 323328-001, Intel Corporation, 28 pages.
Search Report for Taiwanese Patent Application No. 103143714, completed Mar. 20, 2017, 1 page.
Search Report for Taiwanese Patent Application No. 106132793, completed Dec. 6, 2018, 1 page.
Search Report for Taiwanese Patent Application No. 108129291, completed Feb. 7, 2020, 1 page.
Search Report for Taiwanese Patent Application No. 109127729, completed Feb. 2, 2021, 1 page.
Wang, R., et al., "Reducing Power Consumption for Mobile Platforms via Adaptive Traffic Coalescing," IEEE Journal on Selected Areas in Communications, vol. 29, Issue 8, Sep. 2011, IEEE, pp. 1618-1629.
Wilen, A. et al., "Introduction to PCI Express: A Hardware and Software Developer's Guide," Intel Press, 2003, Intel Corporation, 308 pages.
Xiao Y., et al., "IEEE 802.11 Performance Enhancement via Concatenation and Piggyback Mechanisms," IEEE Transactions on Wireless Communications, vol. 4, No. 5, Sep. 2005, pp. 2182-2192.
Yoshida, Y. et al., "A4320MIPS Four-Processor Core SMP/AMP with Individually Managed Clock Frequency for Low Power Consumption," 2007 IEEE International Solid-State Circuits Conference Digest of Technical Papers, Feb. 11-15, 2007, San Francisco, CA, USA, IEEE, 3 pages.
Adams, G., et al., "Design Motivations for Multiple Processor Microcomputer Systems," Computer Design, vol. 17, No. 3, Mar. 1978, pp. 81-89.
Heart, F.E., et al., "A new minicomputer/ multiprocessor for the ARPA network," AFIPS '73: Proceedings of the National Computer Conference and Exposition, Jun. 4-8, 1973, pp. 529-537.
ITC, "Commision Opinion," In the matter of Certain Mobile Electronic Devices and Radion Frequency and Processing Components Thereof, ITC-337-TA-1065, United States International Trade Commision, Apr. 5, 2019, 57 pages.
Black D., "Intel Reveals XMM 7260, XMM 7160, & M.2 4G LTE Modems," Feb. 24, 2014, https://www.tomshardware.com/news/intel-4g-lte-advanced-modems,26115.html, 4 pages.
Blickenstorfer C.H., "Semi-Rugged Notebook with Super Hi-Res Display and Touch Screen Option", Rugged PC Review, Sep. 25, 2012, pp. 1-2.
Bolla R., et al., "Design and Implementation of Cooperative Network Connectivity Proxy Using Universal Plug and Play", May 2013, DOI:10.1007/978-3-642-38082-2_26, 14 Pages.
Bontu C., et al., "DRX Mechanism for Power Saving in LTE," IEEE Communications Magazine, IEEE Service Center, Piscataway, US, vol. 47 (6), Jun. 1, 2009 (Jun. 1, 2009), pp. 48-55, XP011281824, ISSN: 0163-6804, DOI:DOI:10.1109/MCOM.2009.5116800.
Budruk R., et al., "PCI Express System Architecture", Addison-Wesley, US, Sep. 4, 2003, XP007901254, 48 pages.
Business Wire: "Panasonic Upgrades Fully-Rugged Toughbook® 19 Convertible Tablet PC, Faster Processor and Expanded Storage Increases Productivity for Mobile Workers in Extreme Environments," Sep. 4, 2012, https://www.businesswire.com/news/home/20120904005579/en/Panasonic-Upgrades-Fully-Rugged-Toughbook%C2%AE-19-Convertible-Tablet-PC, 3 pages.
Christensen, K., et al., "IEEE 802.3az: The Road to Energy Efficient Ethernet," IEEE Communications Magazine, vol. 48, No. 11, Dec. 2010, pp. 50-56.
Cinterion, "AN32: Integrating USB into GSM Applications," Version 04, Sep. 16, 2008, Cinterion Wireless Modules, 19 pages.
MIPI Alliance, "PCI-SIG and MIPI Alliance Announce Mobile PCIe (M-PCIe) Specification," Feb. 28, 2013, https://www.mipi.org/content/pci-sig-and-mipi-alliance-announce-mobile-pcie-m--pcie-specification, 2 pages.
Mostowfi, M., "Packet Coalescing and Server Substitution for Energy-Proportional Operation of Network Links and Data Servers," Dissertation submitted in partial fulfillment of the requirements for the degree of Doctor of Philosophy, University of South Florida, Jan. 2013, 132 pages.
Dell, "Dell XPS 14z Owner's Manual," 2011, Dell Inc., 74 pages.
US International Trade Commission, Investigation No. 337-TA-1065, In the Matter of Certain Mobile Electric Devices and Radio Frequency and Processing Components Thereof, Notice of the Commission's Final Determination Finding No Violation of Section 337, Termination of the Investigation, Mar. 26, 2019, 4 pages.
United States District Court Southern District Of California, *Qualcomm Incorporated*, Plaintiff, v. *Apple Inc.*, Defendant, Verdict Form, Case No. 3:17-cv-1375-DMS-MDD, Mar. 15, 2019, 5 pages.
Flajslik M., et al., "Network Interface Design for Low Latency Request-Response Protocols," 2013 USENIX Annual Technical Conference (USENIX ATC '13), Jun. 26-28, 2013, San Jose, CA, pp. 333-345.
PCI SIG: "PCI Express Base Specification Revision 3.0," TLP Prefixes, Nov. 10, 2010 (Nov. 10, 2010), XP055586750, Retrieved from the Internet: URL: http://pcisig.com/ [retrieved on May 8, 2019], 7 pages.
Hepp, C., "Review Asus UX32A-R3001V Ultrabook," Notebook Check, Sep. 21, 2012, https://www.notebookcheck.net/Review-Asus-UX32A-R3001V-Ultrabook.82014.0.html, 16 pages.
HP, "HP Pavilion G6 Notebook PC Maintenance and Service Guide," 2012, Hewlett-Packard Development Company, L.P., 126 Pages.
HP, "HP Pavilion G7 Notebook PC Maintenance and Service Guide," 2011, Hewlett-Packard Development Company, L.P., 134 Pages.
Sierra Wireless, "Sierra Wireless AirPrime® Embedded Wireless Modules EM Series", 2014, Sierra Wireless, Inc., www.sierrawireless.com, 2 pages.
PCI-SIG, "PCI-SIG and MIPI Alliance Collaborate to Extend PCI Express Technology to Mobile Devices," Sep. 17, 2012, 2 pages.
Intel, "Energy-Efficient Platforms," White Paper, Designing Devices Using the New Power Management Extensions for Interconnects, Jul. 2009, Intel Corporation, pp. 1-38.
PCI-SIG, "Resizable BAR Capability," PCI-SIG Engineering Change Notice, Jan. 22, 2008, 9 pages.
Piltch A., "Dell Latitude E6420 Review," Laptop Mag, Apr. 17, 2011, https://www.laptopmag.com/reviews/laptops/dell-latitude-e6420, 14 pages.
QuickSpecs, "HP Mobile Broadband Modules Overview of ESM76AA, H4X00AA, H6F23AA, ESM74AA, H4J87AA, QC431AA, WD301AA and ESM75AA", Aug. 2, 2013, 10 pages.
QuickSpecs, "HP Mobile Broadband Modules Overview of QC430AA, QC431AA, and WD301AA", Nov. 3, 2011, 4 pages.
MIPI Alliance, "MIPI® Alliance Boosts Specifications for Camera and Transport Layers in Mobile Device Applications," Feb. 27, 2013, https://www.mipi.org/content/mipi%C2%AE-alliance-boosts-specifications-camera-and-transport-layers-mobile-device-applications, 2 pages.

(56) References Cited

OTHER PUBLICATIONS

Intel Product Brief: "Intel Centrino Advanced-N 6230", 2010, 4 Pages.
Intel Product Brief: "Intel Dual Band Wireless-AC 7260", 2013, 2 Pages.
Intel Product Brief: "Intel Dual Band Wireless-AC 7260", 2014, 2 Pages.
Intel Product Brief: "Intel Ethernet Server Adapter I210", 2012, 5 Pages.
Intel Product Brief: "Intel Wireless-N 7260", 2013, 2 Pages.
QuickSpecs, "HP Mobile Broadband Modules Overview of QC431AA, H4X00AA, WD301AA, H6F23AA, H4J87AA, E5M76AA, E5M75AA, and E5M74AA", Version 20, Apr. 15, 2014, pp. 1-10.
Rubin M., et al., "Which Mobile Protocol is Ideal for your Next Generation Design?" EDN, Jul. 30, 2013, pp. 1-4.
Tseng D., et al., "Low-Power, Dual-Port Solves Inter-Processor Communication Problem in Next-Generation Handsets", Designlines, May 15, 2006, https://www.eetimes.com/low-power-dual-port-solves-inter-processor-communication-problem-in-next-generation-handsets/#, 5 pages.
Jelasity, M., et al., "Gossip-Based Aggregation in Large Dynamic Networks," ACM Transactions on Computer Systems, vol. 23, Issue 3, Aug. 2005, ACM, pp. 219-252.
Jimeno M., et al., "A Network Connection Proxy to Enable Hosts to Sleep and Save Energy" 2008 IEEE International Performance, Computing and Communications Conference, Dec. 7-9, 2008, Austin, TX, USA, IEEE, pp. 101-110.
Kim, S-Y., et al., "High-Performance Low Power Application Processor Integrated with Modem Processor," 2013 International SoC Design Conference (ISOCC), Nov. 17-19, 2013, Busan, South Korea, IEEE, pp. 237-240.
Klug B., "Intel Talks about Multimode LTE Modem—XMM7160 and Beyond," AnandTech, Aug. 20, 2013, https://www.anandtech.com/show/7234/intel-talks-about-multimode-lte-modems-xmm7160-and-beyond, 7 pages.
Lee, S. et al., "CLACK: Cross-Layer ACK-Aided Opportunistic Transmission in Wireless Networks," Wireless Personal Communications: An International Journal, vol. 72, Issue 1, Jan. 19, 2013, pp. 15-34.
Leens, F., "An Introduction to I2C and SPI Protocols," IEEE Instrumentation & Measurement Magazine, vol. 12, Issue 1, Jan. 2009, 6 pages.
Lenovo,"The Lenovo Thinkpad W530 Notebook," Product Datasheet, 2012, Lenovo, 4 pages.
Lenovo,"The Lenovo Thinkpad X230 Notebook," Product Datasheet, 2012, Lenovo, 4 pages.
Li, R., et al., "CuSora: Real-Time Software Radio Using Multi-Core Graphics Processing Unit," Journal of Systems Architecture, vol. 60, Mar. 2014, ACM, pp. 280-292.
PCI Express, "PCI Bus Power Management Interface Specification Rev. 1.0", Mar. 18, 1997.
Smith S.L., "Dell XPS 14z Review," LapTop Mag, Oct. 24, 2011, 13 pages.
PCI Express, "PCI Express Base Specification Revision 2.1", Mar. 4, 2009, 704 pages.
Co-Pending U.S. Appl. No. 17/240,496, inventor Kaushik; Vinod, filed Apr. 26, 2021.
U.S. Court of Appeals for the Federal Circuit, "Judgement," *Qualcomm Incorporated, Appellant* v. *Intel Corporation, Appellee, Andrew Hirshfeld, Performing the Functions and Duties of the Under Secretary of Commerce for Intellectual Property and Director of the U.S. Patent and Trademark Office*, Intervenor, Case 2020-1574; Appeal from the U.S. Patent and Trademark Office, Patent Trial and Appeal Board in Nos. IPR2018-01261, IPR2018-01293, IPR2018-01295, IPR2018-01344, IPR2018-01346, Mar. 2, 2021, 2 pages.
Apple, Inc., "Respondent Apple Inc.'s Notice of Prior Art," In the Matter of Certain Mobile Electronic Devices and Radio Frequency and Processing Components Thereof, United States International Trade Commission Investigation No. 337-TA-1065, Oct. 23, 2017, 155 pages.

* cited by examiner

POWER SAVING TECHNIQUES IN COMPUTING DEVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIMS

*The present application is a reissue continuation of U.S. patent application Ser. No. 17/240,496 filed on Apr. 26, 2021 and entitled "POWER SAVING TECHNIQUES IN COMPUTING DEVICES," which is an application for reissue of U.S. Pat. No. 9,535,490.*

The [present application] *'490 patent* claims priority to U.S. Provisional Patent Application Ser. No. 61/916,498 filed on Dec. 16, 2013 and entitled "POWER SAVING TECHNIQUES IN COMPUTING DEVICES," which is incorporated herein by reference in its entirety.

The [present application] *'490 patent* also claims priority to U.S. Provisional Patent Application Ser. No. 62/019,073 filed on Jun. 30, 2014 and entitled "POWER SAVING TECHNIQUES IN COMPUTING DEVICES," which is incorporated herein by reference in its entirety.

BACKGROUND

I. Field of the Disclosure

The technology of the disclosure relates generally to power saving techniques in computing devices.

II. Background

Computing devices are common within modem society. Ranging from small, mobile computing devices, such as a smart phone or tablet, to large server farms with numerous blades and memory banks, these devices are expected to communicate across myriad networks while providing various other base functions. While desktop devices and servers are generally immune to concerns about power consumption, mobile devices constantly struggle to find a proper balance between available functions and battery life. That is, as more functions are provided, power consumption increases, and battery life is shortened. Servers may likewise have power consumption concerns when assembled in large server farms.

Concurrent with power consumption concerns, improvements in network communications have increased data rates. For example, copper wires have been replaced with higher bandwidth fiber optic cables, and cellular networks have evolved from early Advanced Mobile Phone System (AMPS) and Global System for Mobile Communications (GSM) protocols to 4G and Long Term Evolution (LTE) protocols capable of supporting much higher data rates. As the data rates have increased, the need to be able to process these increased data rates within computing devices has also increased. Thus, earlier mobile computing devices may have had internal buses formed according to a High Speed Inter-Chip (HSIC) standard, universal serial bus (USB) standard (and particularly USB 2.0), or universal asynchronous receiver/transmitter (UART) standard. However, these buses do not support current data rates.

In response to the need for faster internal buses, the peripheral component interconnect express (PCIe) standard, as well as, later generations of USB (e.g., USB 3.0 and subsequent versions) have been adopted for some mobile computing devices. However, while PCIe and USB 3.0 can handle the high data rates currently being used, usage of such buses results in excessive power consumption and negatively impacts battery life by shortening the time between recharging events.

SUMMARY OF THE DISCLOSURE

Aspects disclosed in the detailed description include power saving techniques in computing devices. In particular, as data is received by a modem processor in a computing device, the data is held until the expiration of a modem timer. The data is then passed to an application processor in the computing device over a peripheral component interconnect express (PCIe) interconnectivity bus. On receipt of the data from the modem processor, the application processor sends data held by the application processor to the modem processor over the PCIe interconnectivity bus. The application processor also has an uplink timer. If no data is received from the modem processor before expiration of the uplink timer, the application processor sends any collected data to the modem processor at expiration of the uplink timer. However, if data is received from the modem processor, the uplink timer is reset. By holding or accumulating the data at a source processor in this fashion, unnecessary transitions between low power states and active states on the PCIe bus are reduced and power is conserved.

In an alternate aspect, instead of initiating data transfer based on the expiration of the downlink timer (with or without expiration of the uplink timer), accumulated data transfer may be initiated based on expiration of just an uplink accumulation timer. The uplink accumulation timer may be within a host or a device associated with the interconnectivity bus.

In another alternate aspect, initiation of the data transfer may be based on reaching a predefined threshold for a byte accumulation limit counter. The byte accumulation limit counter is not mutually exclusive relative to the other counters and may operate as an override mechanism for one of the other accumulation timers. Use of such an override may be useful in situations where a sudden burst of data arrives that would exceed buffer space and/or bus bandwidth. Likewise, instead of a byte counter, a packet size counter or a "total number of packets" counter may be used to cover situations where numerous packets or a particularly large packet is delivered by the network.

In further aspects of the present disclosure, the timers may be overridden by other factors or parameters. Such an override is alluded to above with the byte accumulation limit counters and the total number of packets counter, which causes data transfers independently of the timers. Other parameters may also override the timers, such as the presence of low latency traffic (e.g., control messages), synchronizing the uplink and downlink data transfers, or low latency quality of service requirements. When such traffic is present, an interrupt or other command may be used to initiate data transfers before expiration of a timer. Still other factors may override the timers, such as an indication that a device or host is not in an automatic polling mode.

In this regard in one aspect, a mobile terminal is disclosed. The mobile terminal comprises a modem timer. The mobile terminal also comprises a modem processor. The modem processor is configured to hold modem processor to application processor data until expiration of the modem timer. The mobile terminal also comprises an application processor. The mobile terminal also comprises an interconnectivity bus communicatively coupling the application processor to the modem processor. The application processor is configured to hold application processor to modem processor data until receipt of the modem processor to application processor data from the modem processor through the interconnectivity bus after which the application processor to modem processor data is sent to the modem processor through the interconnectivity bus.

In another aspect, a method of controlling power consumption in a computing device is disclosed. The method comprises holding data received by a modem processor from a remote network until expiration of a downlink timer. The method also comprises passing the data received by the modem processor to an application processor over an interconnectivity bus. The method also comprises holding application data generated by an application associated with the application processor for until receipt of the data from the modem processor or expiration of an uplink timer, whichever occurs first.

In another aspect, a mobile terminal is disclosed. The mobile terminal comprises a modem processor. The mobile terminal also comprises an application timer. The mobile terminal also comprises an application processor. The application processor is configured to hold application processor to modem processor data until expiration of the application timer. The mobile terminal also comprises an interconnectivity bus communicatively coupling the application processor to the modem processor. The modem processor is configured to hold modem processor to application processor data until receipt of the application processor to modem processor data from the application processor through the interconnectivity bus after which the modem processor to application processor data is sent to the application processor through the interconnectivity bus.

In another aspect, a mobile terminal is disclosed. The mobile terminal comprises a modem byte accumulation limit counter. The mobile terminal also comprises a modem processor. The modem processor is configured to hold modem processor to application processor data until a predefined threshold of bytes has been reached by the modem byte accumulation limit counter. The mobile terminal also comprises an application processor. The mobile terminal also comprises an interconnectivity bus communicatively coupling the application processor to the modem processor. The application processor is configured to hold application processor to modem processor data until receipt of the modem processor to application processor data from the modem processor through the interconnectivity bus after which the application processor to modem processor data is sent to the modem processor through the interconnectivity bus.

With regards to another aspect, a mobile terminal is disclosed. The mobile terminal comprises a modem packet counter. The mobile terminal also comprises a modem processor. The modem processor is configured to hold modem processor to application processor data until a predefined threshold of packets has been reached by the modem packet counter. The mobile terminal also comprises an application processor. The mobile terminal also comprises an interconnectivity bus communicatively coupling the application processor to the modem processor. The application processor is configured to hold application processor to modem processor data until receipt of the modem processor to application processor data from the modem processor through the interconnectivity bus after which the application processor to modem processor data is sent to the modem processor through the interconnectivity bus.

In another aspect, a mobile terminal is disclosed. The mobile terminal comprises a modem processor. The mobile terminal also comprises an application byte counter. The mobile terminal also comprises an application processor. The application processor is configured to hold application processor to modem processor data until a predefined threshold of bytes has been reached by the application byte counter. The mobile terminal also comprises an interconnectivity bus communicatively coupling the application processor to the modem processor. The modem processor is configured to hold modem processor to application processor data until receipt of the application processor to modem processor data from the application processor through the interconnectivity bus after which the modem processor to application processor data is sent to the application processor through the interconnectivity bus.

In another aspect, a mobile terminal is disclosed. The mobile terminal comprises a modem processor and an application packet counter. The mobile terminal also comprises an application processor. The application processor is configured to hold application processor to modem processor data until a predefined threshold of packets has been reached by the application packet counter. The mobile terminal comprises an interconnectivity bus communicatively coupling the application processor to the modem processor. The modem processor is configured to hold the modem processor to application processor data until receipt of the application processor to modem processor data from the application processor through the interconnectivity bus after which the modem processor to application processor data is sent to the application processor through the interconnectivity bus.

With regards to another aspect, a method is disclosed. The method comprises starting an application timer at an application processor. The method also comprises accumulating data at the application processor until expiration of the application timer. The method comprises sending the accumulated data from the application processor to a modem processor across an interconnectivity bus. The method further comprises holding modem processor data at the modem processor until receipt of the accumulated data from the application processor.

In another aspect, a mobile terminal is disclosed. The mobile terminal comprises a modem timer. The mobile terminal also comprises a modem processor. The modem processor is configured to hold modem processor to application processor data until expiration of the modem timer. The mobile terminal also comprises an application processor. The mobile terminal also comprises an interconnectivity bus communicatively coupling the application processor to the modem processor. The application processor is configured to hold application processor to modem processor data until the modem processor pulls data from the application processor after transmission of the modem processor to application processor data.

DETAILED DESCRIPTION

Figure 1A:
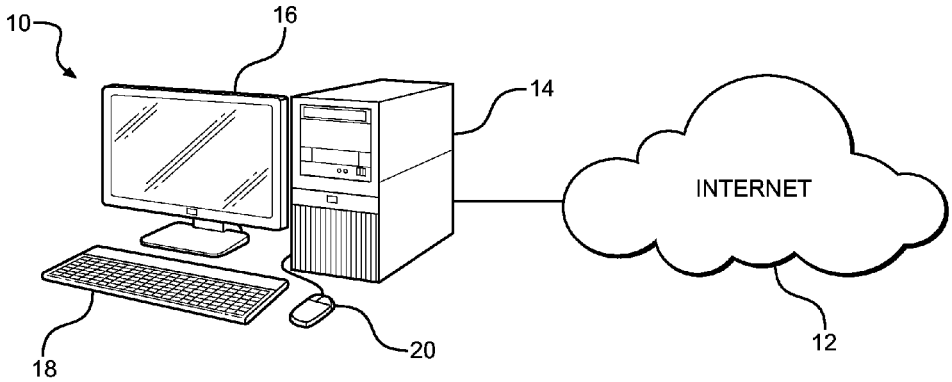
FIG. 1A is a simplified view of a mobile computing device operating with remote networks.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include power saving techniques in computing devices. In particular, as data is received by a modem processor in a computing device, the data is held until the expiration of a modem timer. The data is then passed to an application processor in the computing device over a peripheral component interconnect express (PCIe) interconnectivity bus. On receipt of the data from the modem processor, the application processor sends data held by the application processor to the modem processor over the PCIe interconnectivity bus. The application processor also has an uplink timer. If no data is received from the modem processor before expiration of the uplink timer, the application processor sends any collected data to the modem processor at expiration of the uplink timer. However, if data is received from the modem processor, the uplink timer is reset. By holding or accumulating the data at a source processor in this fashion, unnecessary transitions between low power states and active states on the PCIe bus are reduced and power is conserved.

In an alternate aspect, instead of initiating data transfer based on the expiration of the downlink timer (with or without expiration of the uplink timer), accumulated data transfer may be initiated based on expiration of just an uplink accumulation timer. The uplink accumulation timer may be within a host or a device associated with the interconnectivity bus.

In another alternate aspect, initiation of the data transfer may be based on reaching a predefined threshold for a byte accumulation limit counter. The byte accumulation limit counter is not mutually exclusive relative to the other counters and may operate as an override mechanism for one of the other accumulation timers. Use of such an override may be useful in situations where a sudden burst of data arrives that would exceed buffer space and/or bus bandwidth. Likewise, instead of a byte counter, a packet size counter or a "total number of packets" counter may be used to cover situations where numerous packets or a particularly a large packet is delivered by the network.

In further aspects of the present disclosure, the timers may be overridden by other factors or parameters. Such an override is alluded to above with the byte accumulation limit counters and the total number of packets counter, which causes data transfers independently of the timers. Other parameters may also override the timers, such as the presence of low latency traffic (e.g., control messages), synchronizing the uplink and downlink data transfers, or low latency quality of service requirements. When such traffic is present, an interrupt or other command may be used to initiate data transfers before expiration of a timer. Still other factors may override the timers, such as an indication that a device or host is not in an automatic polling mode.

Figure 1B:
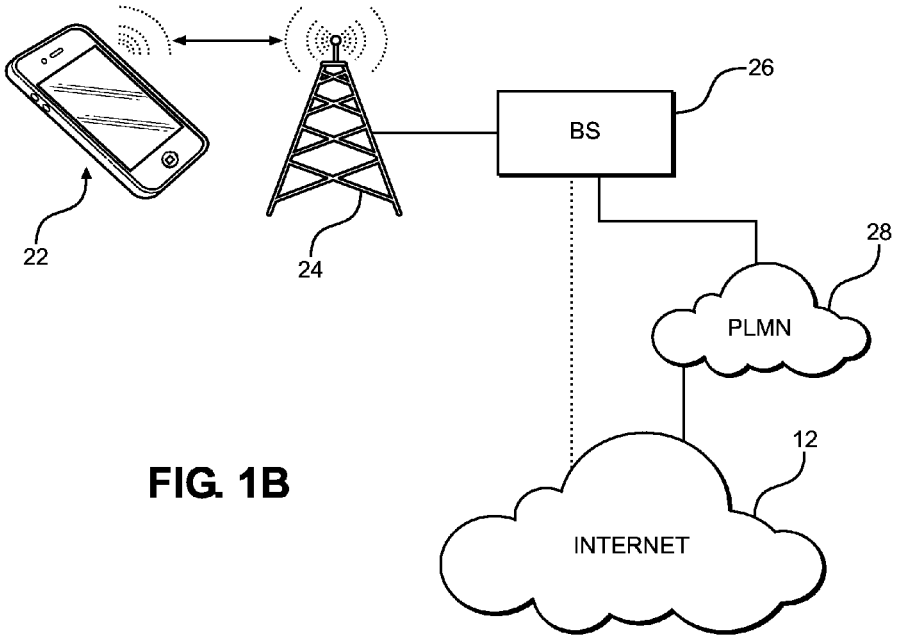
FIG. 1B is a simplified view of a mobile terminal operating with remote networks.

While it is contemplated that the power saving techniques of the present disclosure are used in mobile terminals, such as smart phones or tablets, the present disclosure is not so limited. Accordingly, FIGS. 1A and 1B illustrate computing devices coupled to remote networks via modems that may implement exemplary aspects of the power saving techniques of the present disclosure. In this regard, FIG. 1A illustrates a computing device 10 coupled to a network 12, which, in an exemplary aspect, is the internet. The computing device 10 may include a housing 14 with a central processing unit (CPU) (not illustrated), therein. A user may interact with the computing device 10 through a user interface formed from input/output elements such as a monitor 16 (sometimes referred to as a display), a keyboard 18, and/or a mouse 20. In some aspects, the monitor 16 may be incorporated into the housing 14. While a keyboard 18 and mouse 20 are illustrated input devices, the monitor 16 may be a touchscreen display, which may supplement or replace the keyboard 18 and mouse 20 as an input device. Other input/output devices may also be present as is well understood in conjunction with desktop or laptop style computing devices. While not illustrated in FIG. 1A, the housing 14 may also include a modem, therein. The modem may be positioned on a network interface card (NIC), as is well understood. Likewise, a router and/or an additional modem may be external to the housing 14. For example, the computing device 10 may couple to the network 12 through a router and a cable modem, as is well understood. However, even where such external routers and modems are present, the computing device 10 is likely to have an internal modem to effectuate communication with such external routers and modems.

In addition to the computing device 10, exemplary aspects of the present disclosure may also be implemented on a mobile terminal, which is a form of computing device as that term is used herein. In this regard, an exemplary aspect of a mobile terminal 22 is illustrated in FIG. 1B. The mobile terminal 22 may be a smart phone, such as a SAMSUNG GALAXY™ or APPLE iPHONE®. Instead of a smart phone, the mobile terminal 22 may be a cellular telephone, a tablet, a laptop, or other mobile computing device. The mobile terminal 22 may communicate with a remote antenna 24 associated with a base station (BS) 26. The BS 26 may communicate with the public land mobile network (PLMN) 28, the public switched telephone network (PSTN, not shown), or a network 12 (e.g., the internet), similar to the network 12 in FIG. 1A. It is also possible that the PLMN 28 communicates with the internet (e.g., the network 12) either directly or through an intervening network (e.g., the PSTN). It should be appreciated that most contemporary mobile terminals 22 allow for various types of communication with elements of the network 12. For example, streaming audio, streaming video, and/or web browsing are all common functions on most contemporary mobile terminals 22. Such functions are enabled through applications stored in the memory of the mobile terminal 22 and using the wireless transceiver of the mobile terminal 22.

Figure 1C:
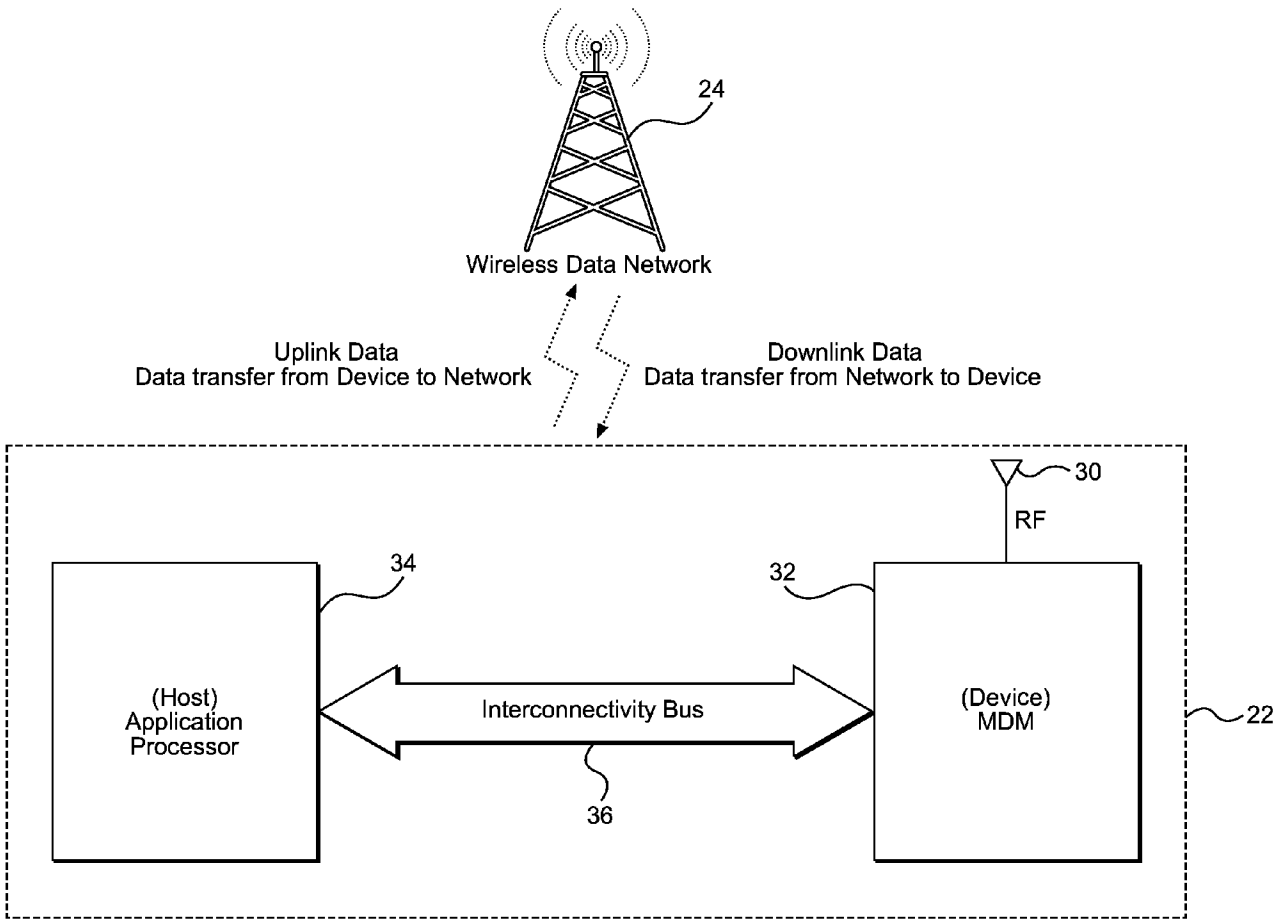
FIG. 1C is an expanded block diagram view of the mobile terminal of FIG. 1B with an interconnectivity bus illustrated.

To effectuate functions, such as streaming video, data arrives from the remote antenna 24 at an antenna 30 of the mobile terminal 22, as illustrated in FIG. 1C. The data is initially processed at a mobile device modem (MDM) 32 of the mobile terminal 22 and passed to an application processor 34 by an interconnectivity bus 36. In this context, the application processor 34 may be a host, and the MDM 32 may be a device as those terms are used in the PCIe standard. While exemplary aspects contemplate operating over a PCIe-compliant interconnectivity bus 36, it is possible that the interconnectivity bus 36 may comply with High Speed Interconnect (HSIC), Universal Asynchronous Receiver/Transmitter (UART), universal serial bus (USB), or the like.

Figure 2:
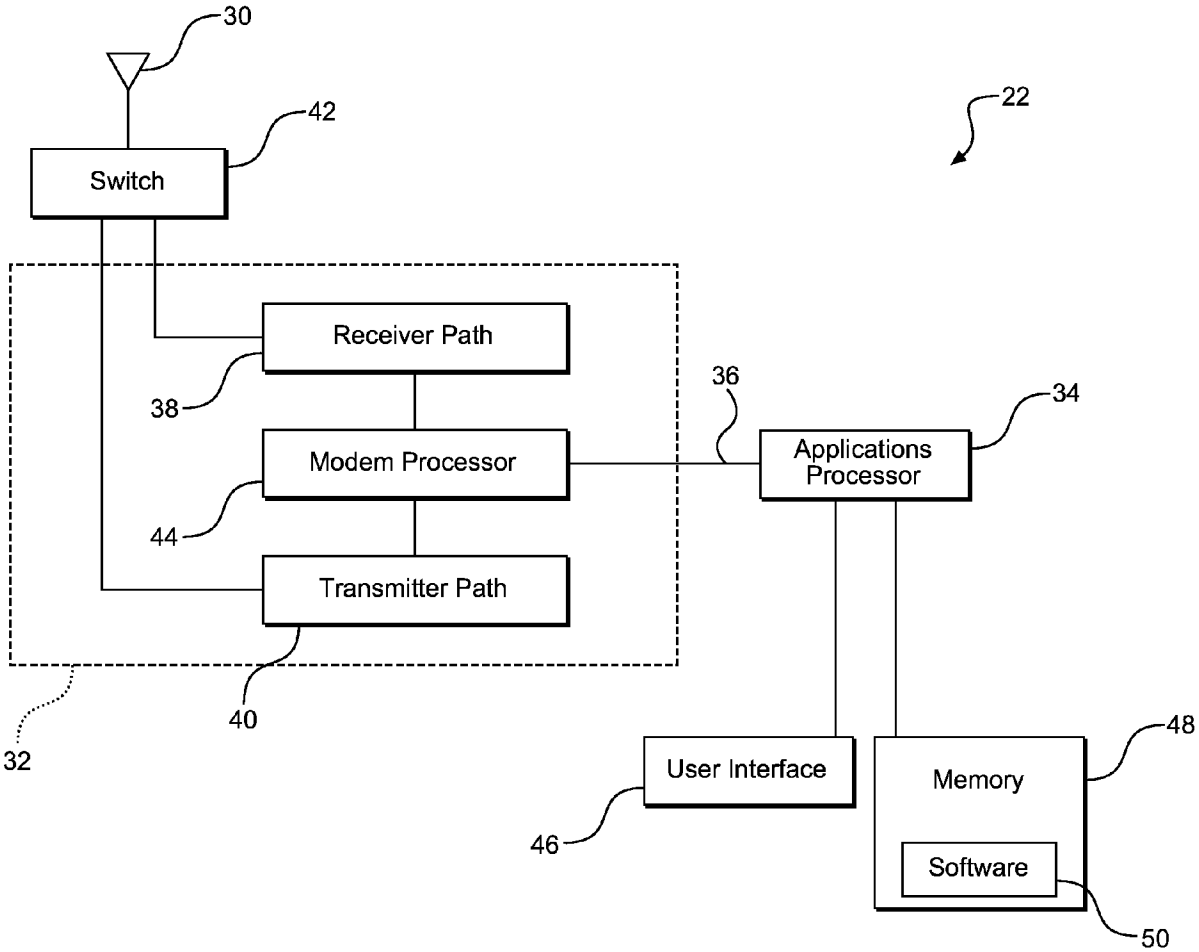
FIG. 2 is a block diagram of the mobile terminal of FIG. 1B.

A more detailed depiction of the components of the mobile terminal 22 is provided with reference to FIG. 2. In this regard, a block diagram of some of the elements of the mobile terminal 22 of FIG. 1B is illustrated. The mobile terminal 22 may include a receiver path 38, a transmitter path 40, the antenna 30 (mentioned above with reference to FIG. 1C), a switch 42, a modem processor 44, and the application processor 34 (also introduced above in reference to FIG. 1C). Optionally, a separate control system (not shown) may also be present with a CPU as is well understood. The application processor 34 and the modem processor 44 are connected by the interconnectivity bus 36. The application processor 34 and/or the control system (if present) may interoperate with a user interface 46 and memory 48 with software 50 stored therein.

The receiver path 38 receives information bearing radio frequency (RF) signals from one or more remote transmitters provided by a base station (e.g., the BS 26 of FIG. 1B). A low noise amplifier (not shown) amplifies the signal. A filter (not shown) minimizes broadband interference in the received signal. Down conversion and digitization circuitry (not shown) down converts the filtered, received signal to an intermediate or baseband frequency signal. The baseband frequency signal is then digitized into one or more digital streams. The receiver path 38 typically uses one or more mixing frequencies generated by the frequency synthesizer. The modem processor 44 may include a base band processor (BBP) (not shown) that processes the digitized received signal to extract the information or data bits conveyed in the signal. As such, the BBP is typically implemented in one or more digital signal processors (DSPs) within the modem processor 44 or as a separate integrated circuit (IC) as needed or desired.

With continued reference to FIG. 2, on the transmit side, the modem processor 44 receives digitized data, which may represent voice, data, or control information, from the application processor 34, which it encodes for transmission. The encoded data is output to the transmitter path 40, where it is used by a modulator (not shown) to modulate a carrier signal at a desired transmit frequency. An RF power amplifier (not shown) amplifies the modulated carrier signal to a level appropriate for transmission, and delivers the amplified and modulated carrier signal to the antenna 30 through the switch 42. Collectively, the modem processor 44, the receiver path 38, and the transmitter path 40 form the MDM 32 of FIG. 1C (sometimes also referred to as a wireless modem). While the MDM 32 is specifically described with relation to the RF signals associated with a cellular signal, the present disclosure is not so limited. For example, a wireless modem using other wireless protocols may also benefit from inclusion of aspects of the present disclosure. Thus, modems operating according to standards such as BLUETOOTH®, the various IEEE 802.11 standards, Universal Mobile Telecommunications System (UMTS), High Speed Packet Access (HSPA), Long Term Evolution (LTE), and other wireless protocols may all use aspects of the present disclosure.

With continued reference to FIG. 2, a user may interact with the mobile terminal 22 via the user interface 46, such as a microphone, a speaker, a keypad, and a display. Audio information encoded in the received signal is recovered by the BBP, and converted into an analog signal suitable for driving the speaker. The keypad and display enable the user to interact with the mobile terminal 22. For example, the keypad and display may enable the user to input numbers to be dialed, access address book information, or the like, as well as monitor call progress information. The memory 48 may have the software 50 therein as noted above, which may effectuate exemplary aspects of the present disclosure.

In conventional mobile terminals that have a PCIe interconnectivity bus (i.e., the interconnectivity bus 36), the PCIe standard allows the interconnectivity bus 36 to be placed into a sleep mode. While placing the interconnectivity bus 36 in a sleep mode generally saves power, such sleep modes do have a drawback in that they consume relatively large amounts of power as they transition out of the sleep mode. This power consumption is exacerbated because of the asynchronous nature of the PCIe interconnectivity bus 36. That is, first data may arrive at the modem processor 44 for transmission to the application processor 34 at a time different than when the second data is ready to pass from the application processor 34 to the modem processor 44. This problem is not unique to the PCIe interconnectivity bus 36.

Figure 3:
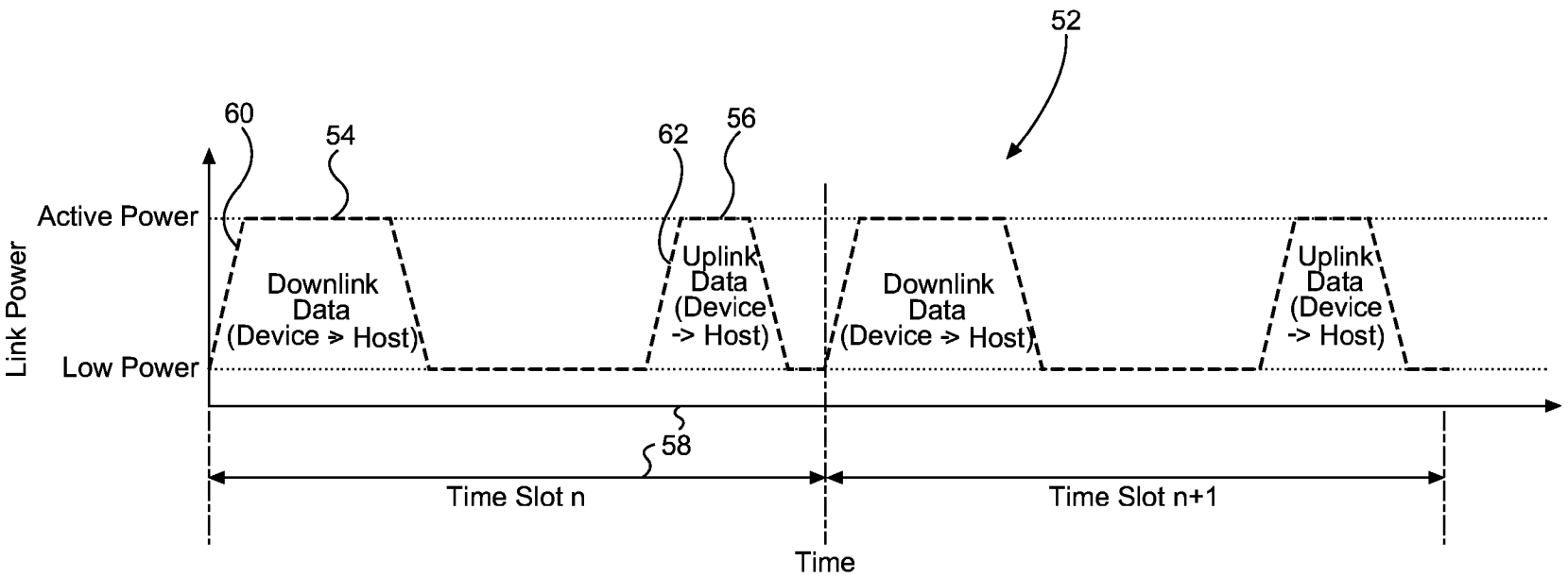
FIG. 3 is an exemplary time versus link power graph in a conventional computing device.

FIG. 3 illustrates a time versus link power graph 52 that highlights how downlink data 54 may have a different transmission time than uplink data 56 within a given time slot 58. In particular, the interconnectivity bus 36 (FIG. 2) begins in a sleep or low power mode and transitions up to an active power mode by transition 60 so that the downlink data 54 may be transmitted to the application processor 34. However, the downlink data 54 may not occupy the entirety of the time slot 58, and the interconnectivity bus 36 may return to a low power state. However, subsequently, but still within the same time slot 58, the uplink data 56 from the application processor 34 is sent to the modem processor 44. Accordingly, the interconnectivity bus 36 is again transitioned from the low power state to the active power state by a second transition 62. In an exemplary aspect, the time slot 58 is approximately one millisecond long. Thus, if two transitions (i.e., 60, 62) from low power to active power occur every time slot 58, then thousands of transitions 60, 62 occur every second. Thousands of transitions 60, 62 consume substantial amounts of power and reduce the battery life of the mobile terminal 22.

Exemplary aspects of the present disclosure reduce the number of transitions (i.e., 60, 62) from low power to active power by synchronizing packet transmission from the modem processor 44 and the application processor 34, which in turn allows the link to be maintained in a low power mode more efficiently since the communication on the link is consolidated to eliminate the second power state transition. In an exemplary aspect, the data (i.e., the modem data) from the modem processor 44 transmits first, and the data (i.e., the application data) from the application processor 34 is sent after arrival of the modem data and before the interconnectivity bus 36 can return to the low power state.

The synchronization is done through the use of timers at the modem processor 44 and the application processor 34. The timers may be longer than a time slot 58 of the interconnectivity bus 36.

In a first exemplary aspect, the timer on the application processor 34 is longer than the timer on the modem processor 44. The accumulation may be done on a per logical channel basis. The timer may be configurable by the application processor 34 using a mechanism suitable to the interconnectivity bus 36. For example, on a fusion device using a modem host interface (MHI) over PCIe, the timer is maintained for every inbound MHI channel and the time value used by the timers shall be configured via a MHI command message or a PCIe memory mapped input/output (MMIO) device configuration register exposed via a base address register (BAR). The BAR is a PCIe standard defined mechanism by which a host maps the registers of a device into its virtual address map. For more information about MHI, the interested reader is referred to U.S. patent application Ser. No. 14/163,846, filed Jan. 24, 2013, which is herein incorporated by reference in its entirety. In other exemplary aspects, the timer on the modem processor 44 is longer than the timer on the application processor 34. In still other exemplary aspects, counters may be used in place of timers. The counters may be bit counters, packet counters, packet size counters, or the like. In other exemplary aspects, use of such alternate counters may be combined with the timers. In still other exemplary aspects, other override criteria may allow for data to be sent before timer or counter expiration so as to reduce latency and/or satisfy the quality of service requirements. The present disclosure steps through each of these aspects in turn, beginning with the situation where there are two timers, and the application processor 34 has a timer that is longer than the timer of the modem processor 44.

Figure 4:
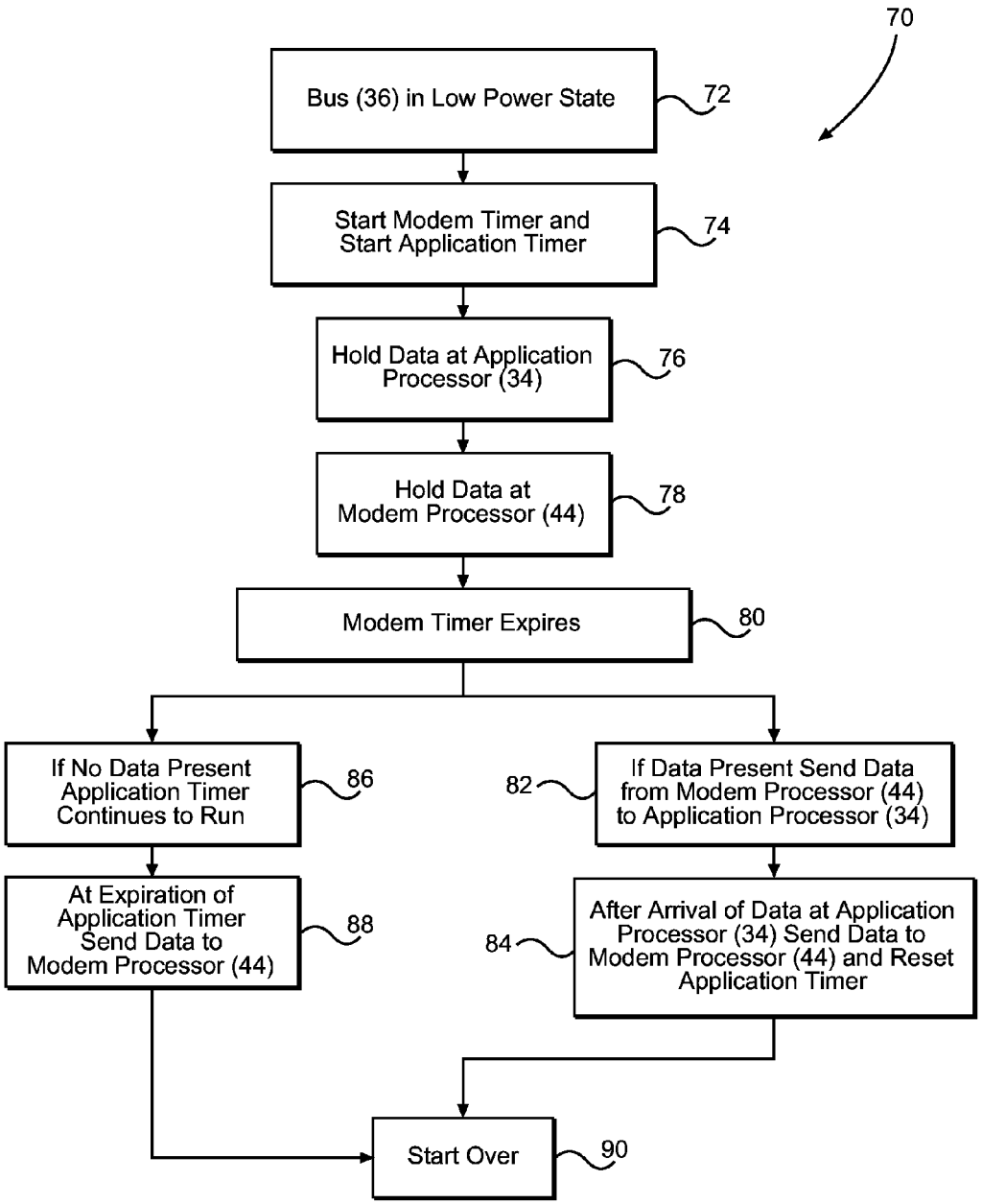
FIG. 4 is a flowchart of an exemplary process for achieving power savings in the mobile terminal of FIG. 1B.

In this regard, FIG. 4 illustrates an exemplary power saving process 70. The process 70 begins with the interconnectivity bus 36 in a low power state (block 72). The modem timer and the application timer are started (block 74). The timers may be software stores in the modem processor 44 and the application processor 34 or may be physical elements, as desired. Data is generated by the application processor 34 and data is received from the network 12 by the modem processor 44. The application data is held at the application processor 34 (block 76), and the modem data is held at the modem processor 44 (block 78) while the timers are running. As noted above, in an exemplary aspect, the time slot 58 of the interconnectivity bus 36 is one millisecond. In such an aspect, the modem timer may be approximately two to six milliseconds, and the application timer is three to seven milliseconds, or at least longer than the modem timer. The modem timer expires (block 80). If modem data is present, the modem data is released by the modem processor 44 through the interconnectivity bus 36 to the application processor 34 (block 82).

The mechanism for data transfer may be initiated and controlled by the modem processor 44 (i.e., the device). For example, on a fusion device using MHI over PCIe, the modem processor 44 may poll (read) the MHI channel Context Write Pointer to determine data buffers where downlink packets can be transferred. The application processor 34 updates the channel context data structure's Context Write Pointer field to point to the data transfer descriptors without ringing an Inbound channel doorbell. The modem processor 44 may poll for updates on the Context Write Pointer field as necessitated by downlink traffic. When the modem processor 44 runs out of buffers, i.e., a transfer ring is empty, and no buffers are present to transfer downlink data, the modem processor 44 may generate an event (e.g., an "out-of-buffer") notification to the application processor 34, followed by an interrupt. Upon receiving the event notification from the modem processor 44, the application processor 34 shall provide data buffers by updating the channel Context Write Pointer and shall ring the Inbound channel doorbell.

After arrival of the modem data at the application processor 34, the application processor 34 releases any application data that has been held at the application processor 34 and resets the application timer (block 84). Note that the application timer can run on the modem processor 44 or the application processor 34. As an alternative, the modem processor 44 may continue to pull the uplink data 56 from the application processor 34 until it detects no further downlink data 54 activity. That is, the modem processor 44 may intersperse pulling the uplink data 56 while receiving the downlink data 54. If, however, no modem data is present at the modem processor 44 when the modem timer expires, the application timer continues (i.e., another millisecond) (block 86). At the expiration of the application timer, the application processor 34 sends any held data to the modem processor 44 through the interconnectivity bus 36 (block 88). The process then repeats by starting over (block 90).

As noted above, the uplink timer (i.e., the application timer) is, in an exemplary aspect, designed to be longer than the downlink timer (i.e., the modem timer) to increase the uplink/downlink synchronization whenever the downlink timer expires. While holding data for an extra time slot adds some latency, the brief amount added is readily absorbed by the application processor 34. Likewise, this latency is considered acceptable for the power savings. For example, by making the period of the modem timer twice the period of the time slot 58, the number of low power to active power transitions is potentially halved. Likewise, by making the period of the application timer six times the period of the time slot 58, the chance of being able to "piggyback" onto the active power state of the interconnectivity bus 36 caused by the modem data is increased, but still frequent enough that any uplink data 56 will still be sent in a timely fashion even if there is no downlink data 54 to trigger releasing the uplink data 56. Similar logic can be extended to synchronize traffic from multiple processors over the data link. In an exemplary aspect, the other processors may each have timer values higher (i.e., longer) than that of the downlink timer, and the processors can exchange their data availability information so that traffic on one processor can trigger the data transfer on other processors if there is data available to transfer.

Figure 5:
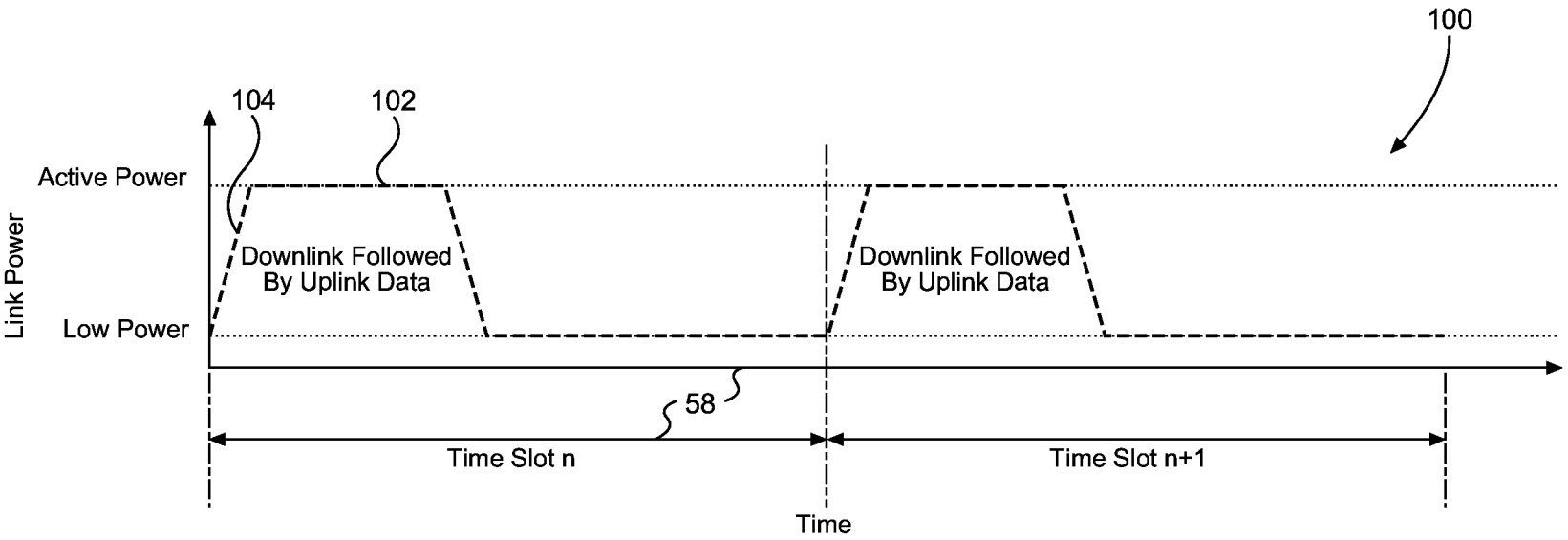
FIG. 5 is an exemplary time versus link power graph in a mobile computing device using the process of FIG. 4.

FIG. 5 illustrates a graph 100 where the uplink data 56 follows the downlink data 54 during an active period 102 of the interconnectivity bus 36 (FIG. 2). As illustrated, there is only one transition 104 from low power to active power per time slot 58. Thus, by consolidating the data into a single active period 102, the overall time that is spent in low power may be increased, thus resulting in power savings. Additionally, power spent transitioning from a low power to active power state is reduced by the elimination of the second transition 62.

While it is conceivable that the uplink data 56 could be sent before the downlink data 54 (i.e., the application timer is shorter than the modem timer), such is generally not considered optimal because there are usually far more downlink packets than uplink packets. If this aspect is used, the application processor 34 may buffer uplink data packets into local memory prior to initiating transfer to the modem processor 44. These accumulated packets are controlled via an uplink accumulation timer. If there are plural channels, then a timer may be applied to each channel independently. When the application processor 34 is unable to use or does not have an uplink timer, the modem processor 44 may be able to instantiate an uplink timer, and upon expiry of the uplink timer, will poll data from the application processor 34. This exemplary aspect is explained in greater detail below with reference to FIGS. 6 and 7.

Figure 6:
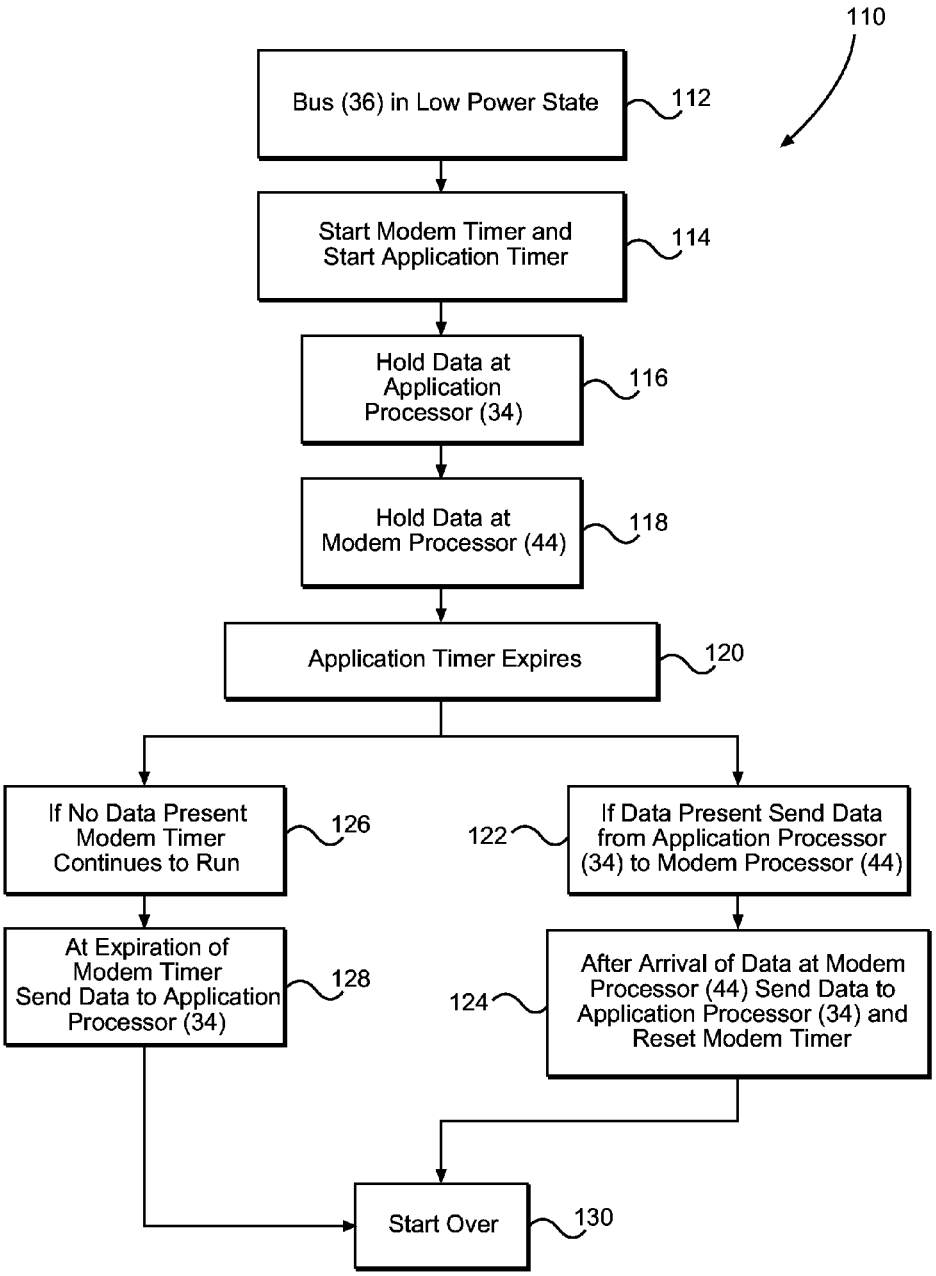
FIG. 6 is a flowchart of another exemplary process for achieving power savings in the mobile computing device.

In this regard, FIG. 6 illustrates an exemplary power saving process 110. The process 110 begins with the interconnectivity bus 36 in a low power state (block 112). The modem timer and the application timer are started (block 114). The timers may be software stored in the modem processor 44 and the application processor 34 or may be physical elements as desired. Data is generated by the application processor 34 and data is received from the network 12 by the modem processor 44. The application data is held at the application processor 34 (block 116), and the modem data is held at the modem processor 44 (block 118) while the timers are running. As noted above, in an exemplary aspect, the time slot 58 of the interconnectivity bus 36 is one millisecond. In such an aspect, the application timer may be approximately two milliseconds, and the modem timer is three milliseconds, or at least longer than the application timer. The application timer expires (block 120). If application data is present, the application data is released by the application processor 34 through the interconnectivity bus 36 to the modem processor 44 (block 122).

After arrival of the application data at the modem processor 44, the modem processor 44 releases any modem data that has been held at the modem processor 44 and resets the modem timer (block 124). Note that the application timer can run on the modem processor 44 or the application processor 34. Likewise, the modem timer can run on the modem processor 44 or the application processor 34.

With continued reference to FIG. 6, if no application data is present at the application processor 34 when the application timer expires, the modem timer continues (i.e., another millisecond) (block 126). At the expiration of the modem timer, the modem processor 44 sends any held data to the application processor 34 through the interconnectivity bus 36 (block 128). The process then repeats by starting over (block 130).

As noted above, in this exemplary aspect, the uplink timer (i.e., the application timer) is, in an exemplary aspect, designed to be shorter than the downlink timer (i.e., the modem timer). While holding data for an extra time slot 58 adds some latency, the brief amount added is readily absorbed by the application processor 34. Likewise, this latency is considered acceptable for the power savings. For example, by making the period of the application timer twice the period of the time slot 58, the number of low power to active power transitions is lowered. Likewise, by making the period of the modem timer six times the period of the time slot 58, the chance of being able to "piggyback" onto the active power state of the interconnectivity bus 36 caused by the application data is increased, but still frequent enough that any downlink data 54 will still be sent in a timely fashion even if there is no uplink data 56 to trigger releasing the downlink data 54. Similar logic can be extended to synchronize traffic from multiple processors over the data link. In an exemplary aspect, the other processors may each have timer values higher (i.e., longer) than that of the uplink timer and the processors can exchange their data availability information so that traffic on one processor can trigger the data transfer on other processors if there is data available to transfer.

Figure 7:
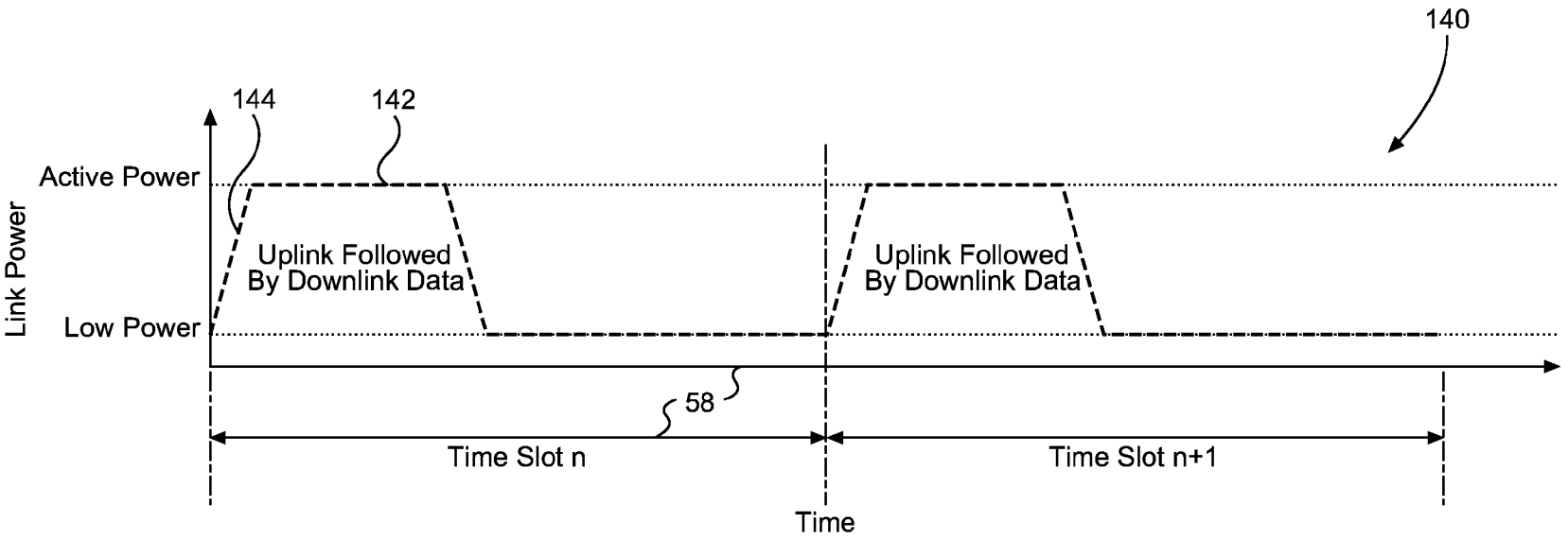
FIG. 7 is an exemplary time versus link power graph in the mobile computing device using the process of FIG. 6.

FIG. 7 illustrates a graph 140 where the uplink data 56 precedes the downlink data 54 during an active period 142 of the interconnectivity bus 36. As illustrated, there is only one transition 144 from low power to active power per time slot 58. Thus, by consolidating the data into a single active period 142, the overall time that is spent in low power may be increased, thus resulting in power savings. Additionally, power spent transitioning from a low power to active power state is reduced by the elimination of the second transition 62.

In an exemplary aspect, the modem processor 44 may override and choose the minima from all configured values of each of the configurable parameters (like downlink or uplink accumulation timers, byte threshold, number of packets threshold, size of packet threshold, or the like) or downlink accumulation expiry timer values (e.g., from among the various channels) as the effective downlink accumulation timer expiry value. Intelligent modem processors 44 may also dynamically override or alter the downlink accumulation timer value depending on the downlink traffic pattern, and/or may adjust the downlink accumulation timer to achieve a desired quality of service (QoS) for data and/or to control traffic. A change of configuration can be triggered/controlled by the application processor 44 or any other processor in the system as well, via MHI control or QMI signaling (such as, for inter process signaling).

In addition to, or in place of, downlink and uplink timers, a byte accumulation limit counter may also be used by the modem processor 44 for downlink traffic and the application processor 34 for uplink traffic. This aspect may be advantageous in situations where there is a sudden burst of data pushed by the network or application. Note that this aspect is not mutually exclusive and may be implemented as an override mechanism for either downlink or uplink timers. For example, if the downlink accumulation timer is set relatively high to conserve power, a sudden burst of data may exceed the buffer capacity of the modem processor 44, or if allowed to accumulate in memory of the modem processor 44, this burst of data may exceed bus bandwidth allocations on the application processor 34. The application processor 34 can determine and configure the maximum byte accumulation limit based on its bus bandwidth budget, and/or buffer size reserved for downlink data transfer. The modem processor 44 can also choose an internal byte accumulation limit based on the size of downlink buffer, and/or interconnect link data throughput. With the byte accumulation limit counters, the modem processor 44 can initiate downlink data transfer to the application processor 34 prior to downlink accumulation timer expiry, if and when the buffered data size exceeds the byte accumulation limit counter. Since both the modem processor 44 and the application processor 34 may have independent recommendations for byte accumulation limit counter, the modem processor 44 may select the minima of these two values to be the effective byte accumulation limit. Similar parameters may be maintained in the application processor 34 to trigger the uplink data 56 transfer immediately (i.e., overriding the uplink accumulation timer).

Instead of, or in addition to the byte accumulation limit counter, a number of packets limit counter may be used. In an exemplary aspect, the packet number limit counter may be of similar design, and can be employed to add number of packet counter limits instead of byte limits to cover cases where a large number of packets are delivered by the network or an application. Again, such a packet limit counter may also be present or associated with the application processor 34 or the modem processor 44. Note, that the accumulation timers (uplink and/or downlink) and other configuration parameters like the number of accumulated packets threshold, accumulated bytes threshold, and the like, may be a function of LTE, HSPA, GERAN, or the like.

In still another exemplary aspect, the modem processor 44 or the application processor 34 may disable downlink or uplink accumulation in cases where there is a necessity to expedite message transfer, for example control messages (like flow control) or high QoS data traffic or low latency traffic, as determined by the modem processor 44 or the application processor 34. Latency introduced by accumulation may not be tolerable for these traffic classes.

Figure 8:
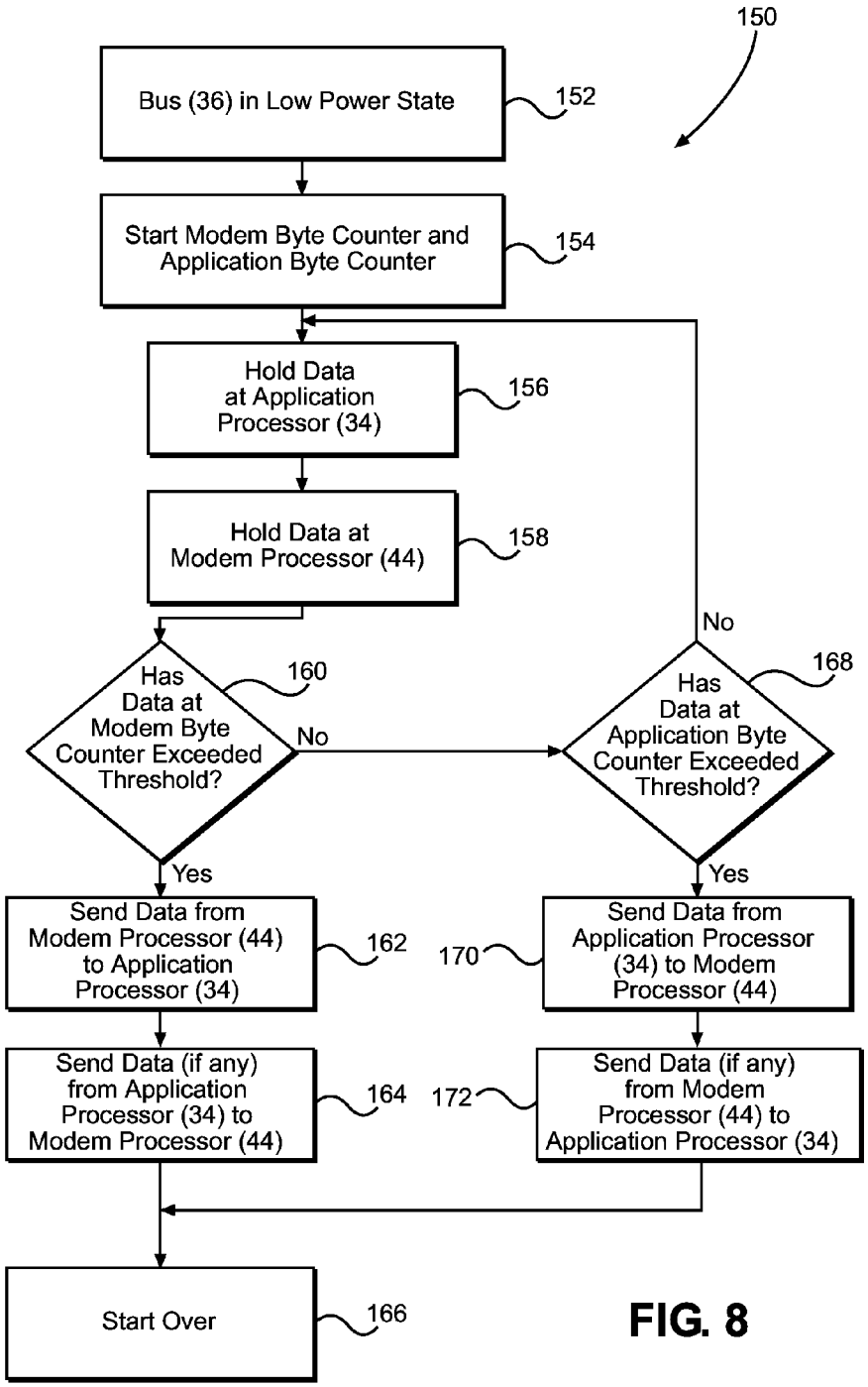
FIG. 8 is a flowchart of an exemplary process that uses a byte counter to control data accumulation.
Figure 9:
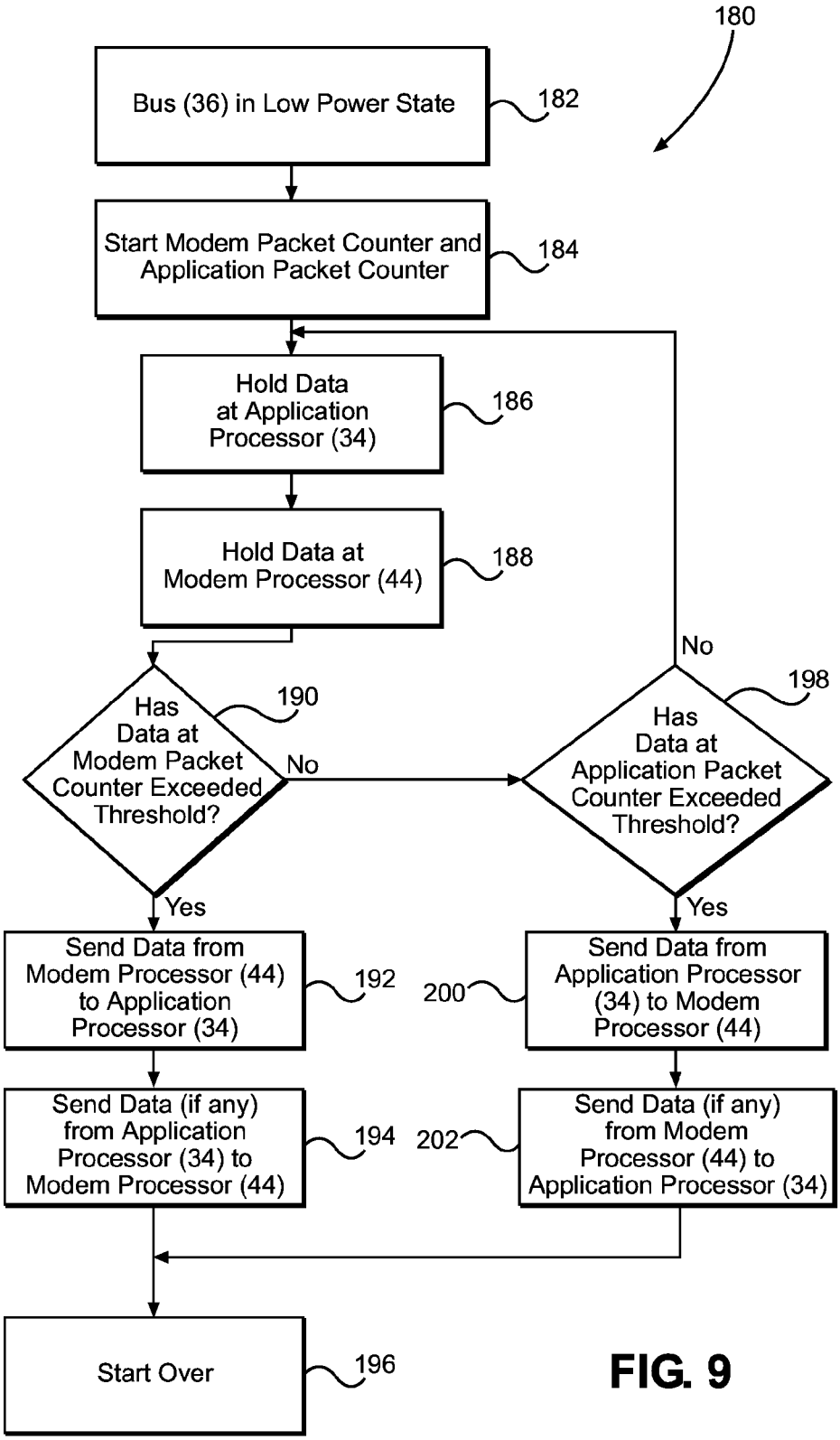
FIG. 9 is a flowchart of an exemplary process that uses a packet counter to control data accumulation.

Returning to the data accumulation based on amounts of data instead of a strict process, FIGS. 8 and 9 illustrate two exemplary aspects. In this regard, FIG. 8 illustrates a process 150 illustrating a byte counter process. In particular, the process 150 begins with the interconnectivity bus 36 in a low power state (block 152). The process 150 starts a modem byte counter and an application byte counter (block 154). Data is held at the application processor 34 (block 156) and the modem processor 44 (block 158). A control system determines if the modem byte counter has exceeded a predefined threshold (block 160) based on the amount of data that has been held or accumulated at the modem processor 44.

With continued reference to FIG. 8, if the answer to block 160 is yes, then data is sent from the modem processor 44 to the application processor 34 (block 162). After receipt of the data from the modem processor 44, the application processor 34 sends data (if any) that has accumulated at the application processor 34 to the modem processor 44 (block 164). Having cleared the accumulated data at both the modem processor 44 and the application processor 34, the process starts over (block 166).

With continued reference to FIG. 8, if the answer to block 160 is no, the control system determines if the data at the application byte counter has exceeded a predefined threshold (block 168). If the answer to block 168 is no, the process 150 returns to block 156 and data continues to be held until a byte counter threshold is exceeded. If, however, the answer to block 168 is yes, then the data is sent from the application processor 34 to the modem processor 44 (block 170). After receipt of the data from the application processor 34, the modem processor 44 sends data (if any) to the application processor 34 (block 172). Having cleared the accumulated data at both the modem processor 44 and the application processor 34, the process 150 starts over (block 166).

While a byte counter may be effective in managing latency, another exemplary aspect uses a packet counter. In this regard, FIG. 9 illustrates a process 180 illustrating a byte counter process. In particular, the process 180 begins with the interconnectivity bus 36 in a low power state (block 182). The process 180 starts a modem packet counter and an application packet counter (block 184). Data is held at the application processor 34 (block 186) and the modem processor 44 (block 188). A control system determines if the modem packet counter has exceeded a predefined threshold (block 190) based on the number of packets held or accumulated at the modem processor 44.

With continued reference to FIG. 9, if the answer to block 190 is yes, then data is sent from the modem processor 44 to the application processor 34 (block 192). After receipt of the packets from the modem processor 44, the application processor 34 sends data (if any) that has accumulated at the application processor 34 to the modem processor 44 (block 194). Having cleared the accumulated packets at both the modem processor 44 and the application processor 34, the process 180 starts over (block 196).

With continued reference to FIG. 9, if the answer to block 190 is no, the control system determines if the number of packets at the application packet counter has exceeded a predefined threshold (block 198). If the answer to block 198 is no, the process 180 returns to block 186 and data continues to be held until a packet counter threshold is exceeded. If, however, the answer to block 198 is yes, then the data is sent from the application processor 34 to the modem processor 44 (block 200). After receipt of the packets from the application processor 34, the modem processor 44 sends data (if any) to the application processor 34 (block 202). Having cleared the accumulated packets at both the modem processor 44 and the application processor 34, the process 180 starts over (block 196).

A similar process may be used, where instead of determining if a particular number of bytes or packets have been accumulated, the control system evaluates a size of packets or whether the system is running low in memory. Likewise, it should be appreciated that certain priority data (e.g., a control signal or other data requiring low latency) may be associated with a flag or other indicator that overrides the timers and/or counters of the present disclosure.

Figure 10:
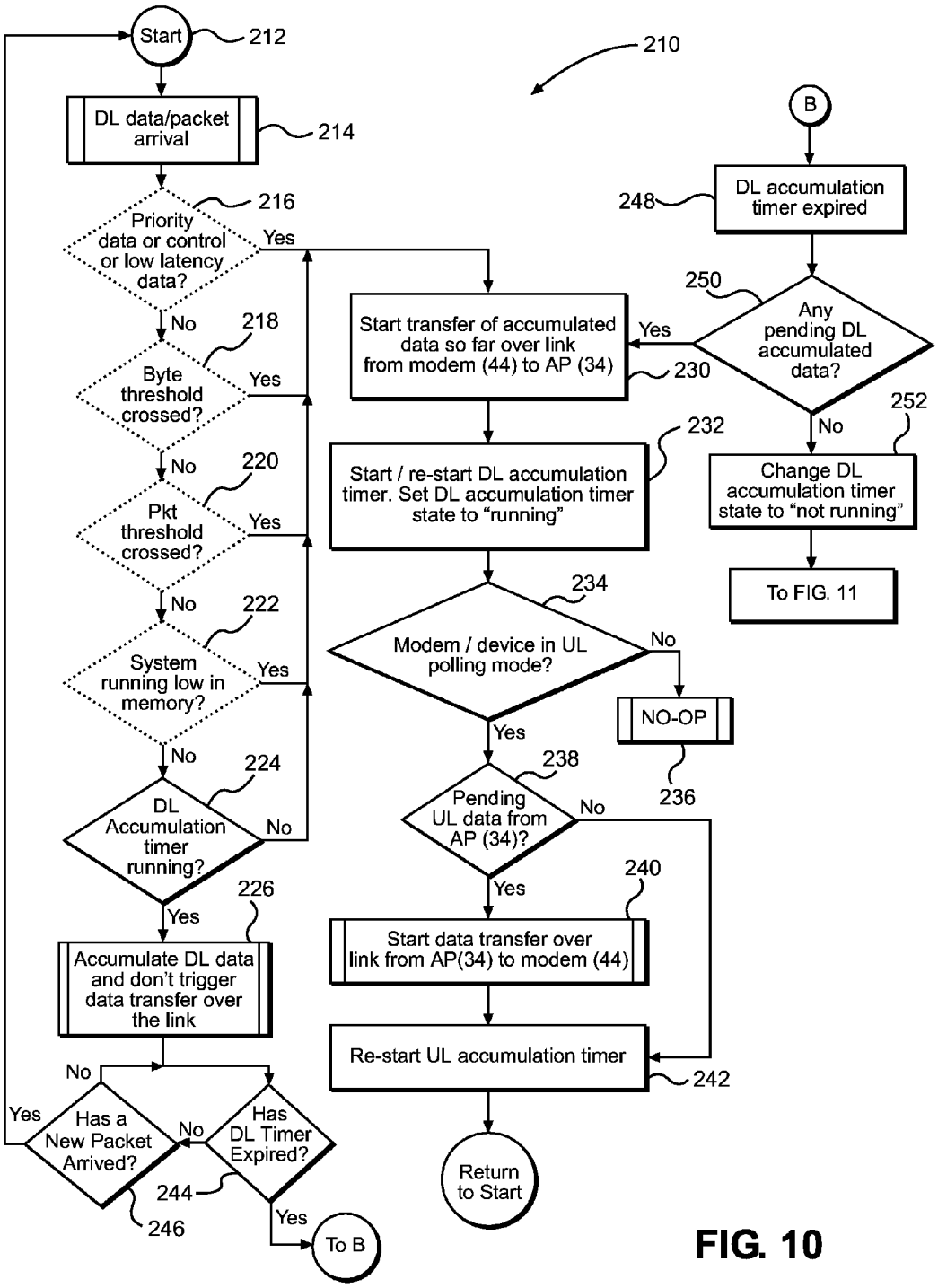
FIG. 10 is a flowchart of a consolidated accumulation process with overrides illustrated from a downlink priority perspective.
Figure 11:
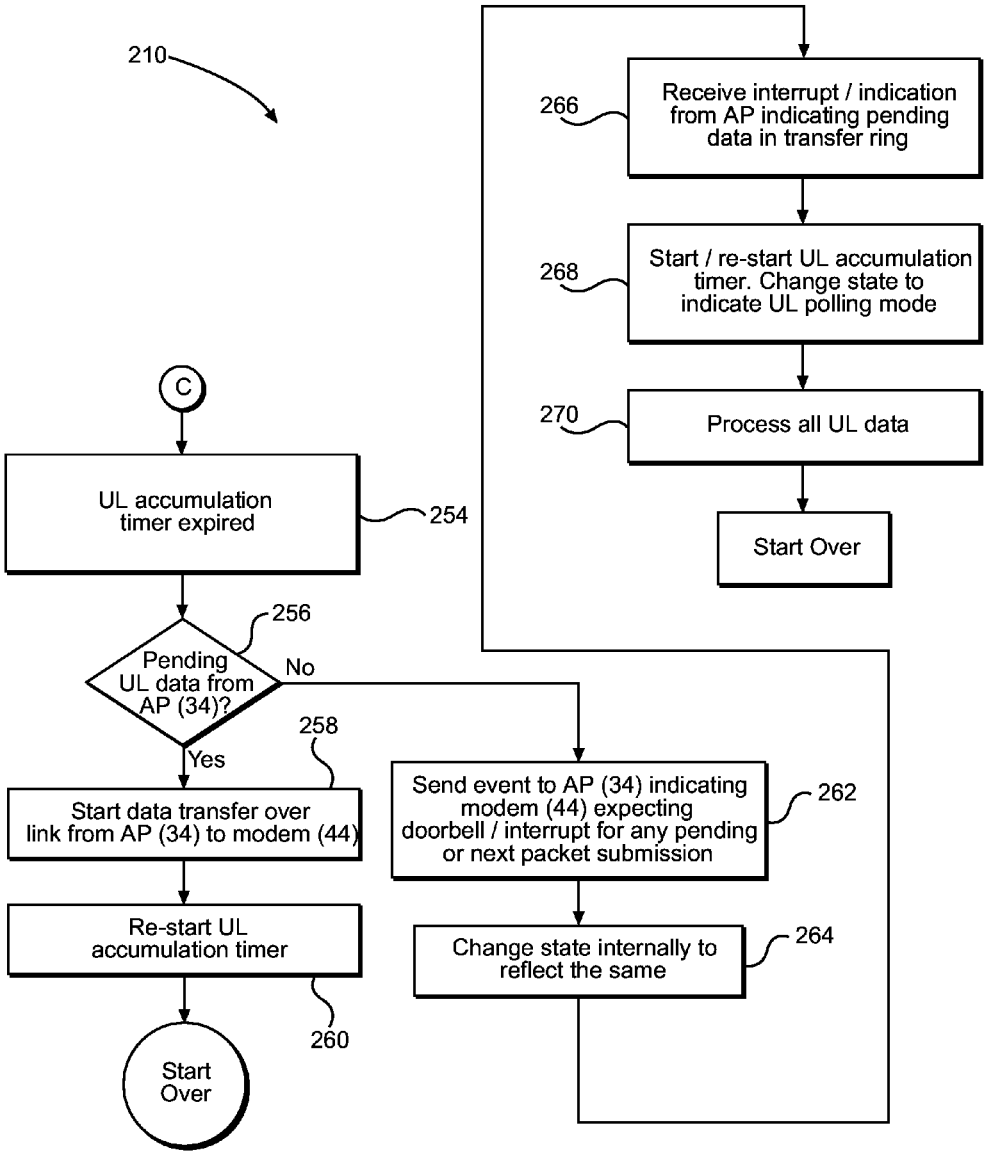
FIG. 11 is a continuation of the flowchart of FIG. 10.
Figure 12:
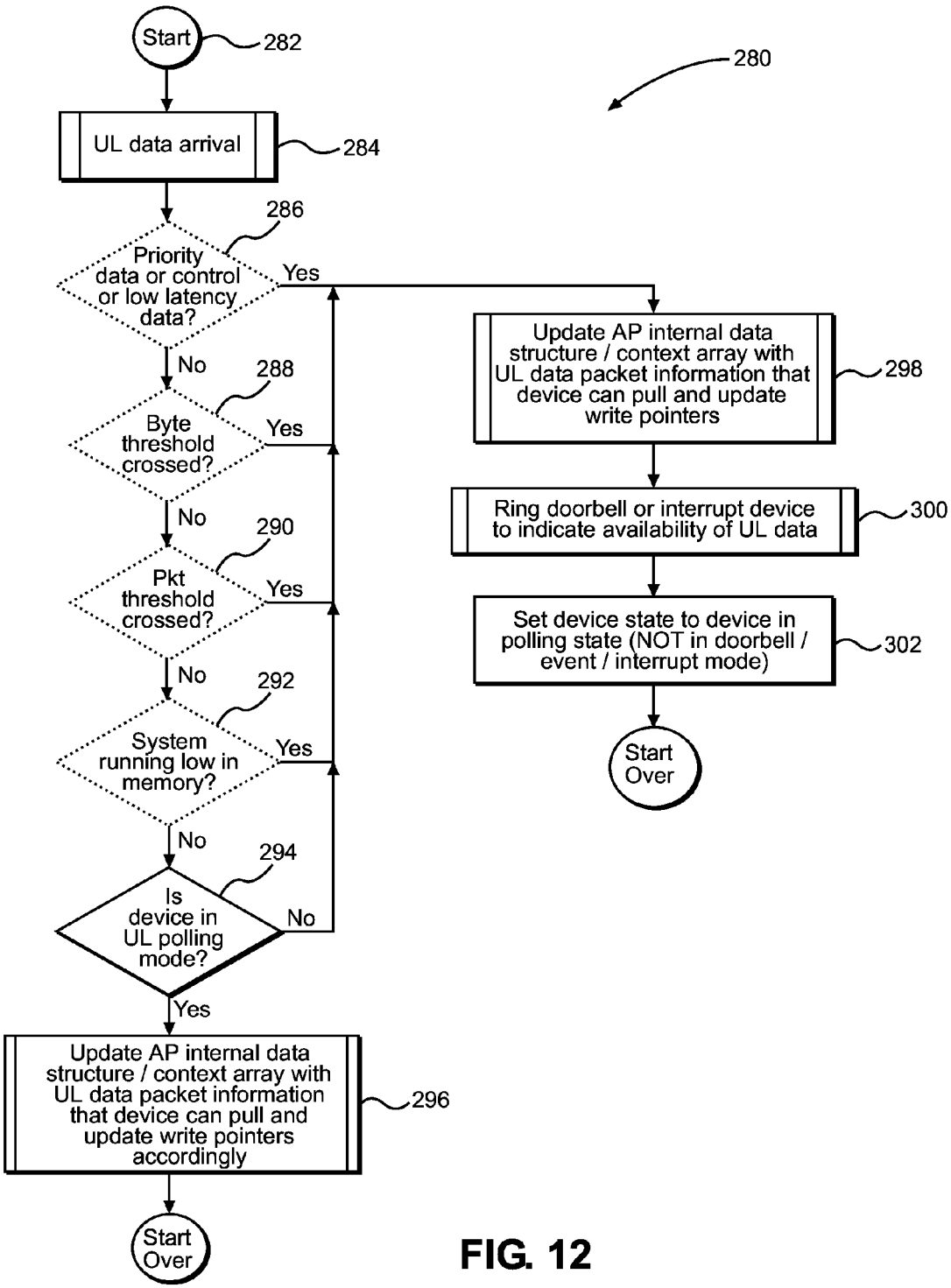
FIG. 12 is a simplified flowchart of a consolidated accumulation process with overrides illustrated from an uplink priority perspective.

As noted above, it should be appreciated that the aspects of the present disclosure are not mutually exclusive and can be combined. The combinations are myriad in that a timer may be used at the application processor 34 with a byte counter at the modem processor 44 (or vice versa), the modem processor 44 works with a timer and a byte counter, while the application processor 34 just has a timer, and so on. In this regard, FIGS. 10-12 are provided that illustrate how the timers and data accumulation counters may interoperate. That is, FIGS. 10 and 11 illustrate how the downlink timer (whether in the modem processor 44 or the application processor 34) is used as the basis for data transmission (e.g., as illustrated in FIGS. 4 and 5), may be combined with the data accumulation counters, and is further modified by a high priority data override. FIG. 12 illustrates a simplified process in which the uplink timer combined with the data accumulation counters is used as the basis for data transmission (e.g., as illustrated in FIGS. 6 and 7), modified by the data overrides.

In this regard, FIGS. 10 and 11 illustrate a combined process 210 that begins at start (block 212). The process 210 continues with the arrival of downlink (DL) data (e.g., a packet) (block 214). The control system evaluates if there is any priority data, control messages, and/or other data that requires low latency (block 216). If the answer to block 216 is no, then the control system determines if a byte threshold has been crossed (i.e., are there more than the threshold worth of bytes in the accumulator) (block 218). If the answer to block 218 is no, then the control system determines if a number of packets threshold has been crossed (i.e., there are more than the threshold worth of packets in the accumulator) (block 220). If the answer to block 220 is no, then the control system determines if the system is running low in memory (block 222). If the answer to block 222 is no, then the control system ascertains if the downlink accumulation timer is running (block 224). If the answer to block 224 is yes, then the downlink data continues to accumulate and no data transfer is initiated over the link (block 226).

With continued reference to FIG. 10, if, however, the answer to block 224 is no, the downlink timer has expired, or if any of the overrides from block 216, 218, 220, or 222 has been answered affirmatively, then the process 210 starts transfer of the accumulated data (including the current packet) over the link from the modem processor 44 (also sometimes referred to as modem (44) in the Figures) to the application processor 34 (also sometimes referred to as AP (34) in the Figures) (block 230). The control system starts or restarts the downlink accumulation timer and sets the downlink accumulation timer to running (block 232). The control system determines if the modem processor 44 is in an uplink (UL) polling mode (block 234). If the answer to block 234 is no, then there is no uplink transfer (block 236). If, however, the modem processor 44 is polling the uplink device, then, based on that polling, the control system determines if there is pending uplink data from the application processor 34 (block 238). If there is pending data (i.e., the answer to block 238 is yes), then the application processor 34 starts data transfer to the modem processor 44 (block 240). Once the data transfer is finished, or if there was no data at block 238, the control system restarts the uplink accumulation timer (block 242) and the process 210 returns to start 212.

With continued reference to FIG. 10, after block 226, the control system determines if the downlink timer has expired (block 244). If the answer to block 244 is no, the control system determines if a new packet has arrived (block 246). If the answer to block 246 is no, then the process 210 returns to block 244. If a new packet has arrived, the process 210 returns to the start 212. If the answer to block 244 is yes, the downlink timer has expired, the control system knows the downlink accumulation timer has expired (block 248). At expiration of the downlink timer, the control system determines if there is any pending accumulated downlink data (block 250). If there is data at block 250, then the data is transferred at block 230. If there is no data, then the downlink accumulation timer is set to "not running" (block 252) and the process 210 goes to FIG. 11, element C. It should be appreciated that blocks 216, 218, 220, and 222 are optional.

With reference to FIG. 11, the process 210 may continue from block 252. At this point, the uplink accumulation timer has expired (block 254). The uplink accumulation timer will expire if there is no downlink data since the uplink timer was restarted. The control system determines if there is any pending uplink data from the application processor 34 (block 256). If the answer to block 256 is yes, then the application processor 34 starts the data transfer over the link from the application processor 34 to the modem processor 44 (block 258). The control system then restarts the uplink accumulation timer (block 260). If, however, the answer to block 256 is no, there is no data, the control system sends an event to the application processor 34 indicating the modem processor 44 is expecting a doorbell/interrupt for any pending or next packet submission (block 262). That is, since there has been no data from the application processor 34 to the modem processor 44 since the previous poll time, then the modem processor 44 may go into an interrupt mode for uplink data and the modem processor 44 would expect the application processor 34 to send an interrupt whenever there was data pending at the application processor 34. The control system then changes the state internally to reflect the same (block 264).

With continued reference to FIG. 11, the modem processor 44 receives an interrupt or other indication from the application processor 34 indicating pending data in the transfer ring (block 266). The control system then restarts the uplink accumulation timer and changes the state to indicate the uplink polling mode (block 268). All the uplink data is processed (block 270) and the process 210 starts over.

In another alternate aspect, there may be situations where the buffers of the application processor 34 may be full and there is no room for data from the modem processor 44. In such an event, the application processor 34 may so inform the modem processor 44, and the modem processor 44 may send an event to the application processor 34 to provide an interrupt signal to the modem processor 44 when there are free buffers.

FIG. 12 is similar to FIGS. 10 and 11, in that it illustrates how overrides and data counters may be used in conjunction with an accumulation timer, but a process 280 of FIG. 12 assumes that the uplink timer is shorter than the downlink timer (e.g., analogous to the aspect illustrated in FIGS. 6 and 7). The process 280 begins at start (block 282). The process 280 continues with the arrival of uplink (UL) data (e.g., a packet) (block 284). The control system evaluates if there is any priority data, control messages, and/or other data that requires low latency (block 286). If the answer to block 286 is no, then the control system determines if a byte threshold has been crossed (i.e., are there more than the threshold worth of bytes in the accumulator) (block 288). If the answer to block 288 is no, then the control system determines if a number of packets threshold has been crossed (i.e., there are more than the threshold worth of packets in the accumulator) (block 290). If the answer to block 290 is no, then the control system determines if the system is running low in memory (block 292). If the answer to block 292 is no, then the control system ascertains if the device is in an uplink polling mode (block 294). If the answer to block 294 is yes, the device is in the polling mode, then the application processor 34 updates the internal data structure/context array with uplink data packet information that the device can pull and update write pointers accordingly (block 296).

With continued reference to FIG. 12, if, however, the answer to block 294 is no, the device is not in an uplink polling mode, or if any of the overrides from blocks 286, 288, 290, or 292 has been answered affirmatively, then the application processor 34 updates the internal data structure/context array with uplink data packet information that the device can pull and update write pointers accordingly (block 298). The application processor 34 then rings the doorbell or otherwise interrupts the device to indicate the availability of uplink data (block 300). The application processor 34 then sets the device state to the polling state (not the doorbell/event/interrupt mode) (block 302), and the process repeats.

It should be appreciated that similar processes may be performed where both timers are in the application processor 34 or the modem processor 44 or are split between the respective processors 34, 44. Likewise, once a timer has expired, data can be pulled or pushed across the interconnectivity bus 36 based on polling, setting doorbell registers, or other technique.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

[1. A mobile terminal comprising:

a modem timer;

a modem processor, the modem processor configured to hold modem processor to application processor data until expiration of the modem timer;

an application processor;

an interconnectivity bus communicatively coupling the application processor to the modem processor; and the application processor configured to hold application processor to modem processor data until triggered by receipt of the modem processor to application processor data from the modem processor through the interconnectivity bus after which the application processor to modem processor data is sent to the modem processor through the interconnectivity bus responsive to the receipt of the modem processor to application processor data from the modem processor through the interconnectivity bus.]

[2. The mobile terminal of claim 1, wherein the interconnectivity bus comprises a peripheral component interconnect (PCI) compliant bus.]

[3. The mobile terminal of claim 2, wherein the PCI compliant bus comprises a PCI express (PCIe) bus.]

[4. The mobile terminal of claim 1, wherein the application processor includes an uplink timer and the uplink timer has a period longer than a period of the modem timer.]

[5. The mobile terminal of claim 4, wherein the application processor is configured to hold the application processor to modem processor data until receipt of the modem processor to application processor data from the modem processor or expiration of the uplink timer having a period longer than a period of the modem timer, whichever occurs first.]

[6. The mobile terminal of claim 1, wherein the modem timer is implemented in software.]

[7. The mobile terminal of claim 1, wherein the modem timer has a period of approximately six (6) milliseconds.]

[8. The mobile terminal of claim 1, wherein the modem processor comprises the modem timer.]

[9. The mobile terminal of claim 1, wherein the application processor comprises the modem timer.]

[10. The mobile terminal of claim 1, further comprising an application timer, and wherein the modem processor is configured to instruct the application processor to send an interrupt if no data is received within one time slot of the application timer.]

[11. The mobile terminal of claim 1, further comprising a byte accumulation limit counter associated with the modem processor, the modem processor configured to send data to the application processor if a threshold associated with the byte accumulation limit counter is exceeded.]

[12. The mobile terminal of claim 1, further comprising a packet number limit counter associated with the modem processor, the modem processor configured to send data to the application processor if a threshold associated with the packet number limit counter is exceeded.]

[13. The mobile terminal of claim 1, wherein the modem processor is configured to determine if held data comprises a control packet and send such control packet before expiration of the modem timer.]

[14. The mobile terminal of claim 3, wherein the modem processor further comprises an application timer, and the modem processor is configured to pull data from the application processor on receipt of the modem processor to application processor data or expiration of the application timer.]

[15. The mobile terminal of claim 1, further comprising a second modem processor, the second modem processor configured to exchange data availability information with the modem processor such that traffic on the modem processor can trigger data transfer for the second modem processor.]

[16. A method of controlling power consumption in a computing device, comprising:

holding data received by a modem processor from a remote network until expiration of a downlink timer;

passing the data received by the modem processor to an application processor over an interconnectivity bus; and holding application data generated by an application associated with the application processor until receipt of the data from the modem processor or expiration of an uplink timer, whichever occurs first, wherein receipt of the data from the modem processor triggers passing the data received by the application processor to the modem processor over the interconnectivity bus before the interconnectivity bus transitions from an active power state to a low power state.]

[17. The method of claim 16, wherein passing the data comprises passing the data over a peripheral component interface (PCI) compliant bus.]

[18. The method of claim 16, wherein a period of the downlink timer comprises six (6) milliseconds.]

[19. The method of claim 16, wherein a period of the uplink timer comprises seven (7) milliseconds.]

[20. The method of claim 16, further comprising providing an override capability based on one of accumulated packet size, accumulated packet count, accumulated byte count, quality of service requirement, and control message status.]

[21. The method of claim 16, further comprising holding data at a second modem processor until traffic on the modem processor triggers data transfer for the second modem processor.]

[22. A mobile terminal comprising:

a modem processor;

an application timer;

an application processor, the application processor configured to hold application processor to modem processor data until expiration of the application timer;

an interconnectivity bus communicatively coupling the application processor to the modem processor; and the modem processor configured to hold modem processor to application processor data until triggered by receipt of the application processor to modem processor data from the application processor through the interconnectivity bus after which the modem processor to application processor data is sent to the application processor through the interconnectivity bus responsive to the receipt of the application processor to modem processor data from the application processor through the interconnectivity bus.]

[23. The mobile terminal of claim 22, wherein the application processor comprises the application timer.]

[24. The mobile terminal of claim 22, wherein the modem processor comprises the application timer.]

[25. The mobile terminal of claim 22, further comprising a byte counter counting bytes at the modem processor.]

[26. A mobile terminal comprising:

a modem byte accumulation limit counter;

a modem processor, the modem processor configured to hold modem processor to application processor data until a predefined threshold of bytes has been reached by the modem byte accumulation limit counter;

an application processor;

an interconnectivity bus communicatively coupling the application processor to the modem processor; and the application processor configured to hold application processor to modem processor data until triggered by receipt of the modem processor to application processor data from the modem processor through the interconnectivity bus after which the application processor to modem processor data is sent to the modem processor through the interconnectivity bus responsive to the receipt of the modem processor to application processor data from the modem processor through the interconnectivity bus.]

[27. A mobile terminal comprising:

a modem packet counter;

a modem processor, the modem processor configured to hold modem processor to application processor data until a predefined threshold of packets has been reached by the modem packet counter;

an application processor;

an interconnectivity bus communicatively coupling the application processor to the modem processor; and the application processor configured to hold application processor to modem processor data until triggered by receipt of the modem processor to application processor data from the modem processor through the interconnectivity bus after which the application processor to modem processor data is sent to the modem processor through the interconnectivity bus responsive to the receipt of the modem processor to application processor data from the modem processor through the interconnectivity bus.]

[28. A mobile terminal comprising:

a modem processor;

an application byte counter;

an application processor, the application processor configured to hold application processor to modem processor data until a predefined threshold of bytes has been reached by the application byte counter;

an interconnectivity bus communicatively coupling the application processor to the modem processor; and the modem processor configured to hold modem processor to application processor data until triggered by receipt of the application processor to modem processor data from the application processor through the interconnectivity bus after which the modem processor to application processor data is sent to the application processor through the interconnectivity bus responsive to the receipt of the application processor to modem processor data from the application processor through the interconnectivity bus.]

[29. A mobile terminal comprising:

a modem processor;

an application packet counter;

an application processor, the application processor configured to hold application processor to modem processor data until a predefined threshold of packets has been reached by the application packet counter;

an interconnectivity bus communicatively coupling the application processor to the modem processor; and the modem processor configured to hold modem processor to application processor data until triggered by receipt of the application processor to modem processor data from the application processor through the interconnectivity bus after which the modem processor to application processor data is sent to the application processor through the interconnectivity bus responsive to the receipt of the modem processor to application processor data from the modem processor through the interconnectivity bus.]

[30. A method comprising:

starting an application timer at an application processor;

accumulating data at the application processor until expiration of the application timer;

sending the accumulated data from the application processor to a modem processor across an interconnectivity bus; and holding modem processor data at the modem processor until triggered by receipt of the accumulated data from the application processor, wherein receipt of the accumulated data from the application processor triggers passing the modem processor data to the application processor over the interconnectivity bus before the interconnectivity bus transitions from an active power state to a low power state.]

[31. A mobile terminal comprising:

a modem timer;

a modem processor, the modem processor configured to hold modem processor to application processor data until expiration of the modem timer;

an application processor;

an interconnectivity bus communicatively coupling the application processor to the modem processor; and the application processor configured to hold application processor to modem processor data until the modem processor pulls data from the application processor after transmission of the modem processor to application processor data, wherein the modem processor is further configured pull data from the application processor after transmission of the modem processor to application processor data and before the interconnectivity bus transitions from an active power state to a low power state.]

*32. A mobile terminal comprising:*

*a modem timer;*

*a modem processor, the modem processor configured to hold modem processor-to-application processor data until expiration of the modem timer;*

*an application timer having a period longer than a period of the modem timer;*

*an application processor, the application processor configured to hold application processor-to-modem processor data until the modem processor pulls data from the application processor;*

*an interconnectivity bus communicatively coupling the application processor to the modem processor, the interconnectivity bus having an active period and a sleep period; and*

*the modem processor further configured, based on the period of the modem timer and the period of the application timer, to synchronize transfer of the application processor-to-modem processor data and the modem processor-to-application processor data during a single active period of the interconnectivity bus, wherein the modem processor and the application processor reside in the mobile terminal.*

*33. The mobile terminal of claim 32, wherein the modem processor is further configured to instruct the application processor to send an interrupt when no data is received before expiration of the application timer.*

*34. The mobile terminal of claim 32, wherein the application processor is further configured to store the pulled data via a write pointer.*

*35. The mobile terminal of claim 32, wherein the modem processor is further configured to pull the data from the application processor based on a data buffer address set up by the application processor.*

*36. A mobile terminal comprising:*

*a modem timer;*

*a modem processor, the modem processor configured to hold modem processor-to-application processor data until expiration of the modem timer;*

*an application timer;*

*an application processor;*

*an interconnectivity bus communicatively coupling the application processor to the modem processor, the interconnectivity bus having active mode periods and low-power mode periods; and*

*the application processor configured to hold application processor-to-modem processor data until the modem processor pulls data from the application processor on arrival of the modem processor-to-application processor data from the modem processor through the interconnectivity bus, wherein the application processor-to-modem processor data and the modem processor-to-application processor data are released during a same active mode period and the modem processor and the application processor reside in the mobile terminal.*

*37. The mobile terminal of claim 36, wherein the modem processor is further configured to instruct the application processor to send an interrupt when no data is received before expiration of the application timer.*

*38. The mobile terminal of claim 36, wherein the application processor is further configured to store the pulled data via a write pointer.*

*39. The mobile terminal of claim 36, wherein the modem processor is further configured to pull the data from the application processor based on a data buffer address set up by the application processor.*

*40. The mobile terminal of claim 36, wherein the application timer has a period longer than a period of the modem timer.*

*41. A mobile terminal comprising:*

*a modem processor comprising a modem timer, the modem processor configured to hold modem processor to application processor data until expiration of the modem timer;*

*an application processor;*

*an interconnectivity bus communicatively coupling the application processor to the modem processor; and*

*the application processor configured to hold application processor to modem processor data until triggered by receipt of the modem processor to application processor data from the modem processor through the interconnectivity bus after which the application processor to modem processor data is sent to the modem processor through the interconnectivity bus responsive to the receipt of the modem processor to application processor data from the modem processor through the interconnectivity bus,*

*wherein the interconnectivity bus comprises a peripheral component interconnect (PCI) compliant bus,*

*wherein the PCI compliant bus comprises a PCI express (PCIe) bus, and*

*wherein the modem processor further comprises an application timer, and the modem processor is configured to pull data from the application processor on the receipt*

*of the modem processor to application processor data or expiration of the application timer.*

* * * * *